United States Patent
Kawamoto et al.

(10) Patent No.: US 9,705,858 B2
(45) Date of Patent: Jul. 11, 2017

(54) INFORMATION PROCESSING DEVICE AND INFORMATION PROCESSING METHOD TO MAINTAIN SECRET KEY FOR AUTHENTICATION

(71) Applicant: SONY CORPORATION, Tokyo (JP)

(72) Inventors: Yohei Kawamoto, Tokyo (JP); Taizo Shirai, Kanagawa (JP); Koichi Sakumoto, Tokyo (JP); Yu Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 153 days.

(21) Appl. No.: 14/557,339

(22) Filed: Dec. 1, 2014

(65) Prior Publication Data
US 2015/0163209 A1 Jun. 11, 2015

(30) Foreign Application Priority Data

Dec. 9, 2013 (JP) ................................. 2013-254030

(51) Int. Cl.
*H04L 9/00* (2006.01)
*H04L 29/06* (2006.01)

(52) U.S. Cl.
CPC ............ *H04L 63/062* (2013.01); *H04L 63/08* (2013.01); *H04L 2463/062* (2013.01)

(58) Field of Classification Search
CPC .. H04L 63/08; H04L 63/062; H04L 2463/062
See application file for complete search history.

(56) References Cited

U.S. PATENT DOCUMENTS

| 7,702,775 | B2* | 4/2010 | Kuan ...................... H04L 12/26 370/252 |
| 8,051,471 | B2* | 11/2011 | Shishido ................. G06F 21/35 235/380 |
| 8,302,184 | B2* | 10/2012 | Masui ...................... H04L 9/32 713/172 |
| 2011/0016317 | A1* | 1/2011 | Abe ...................... H04L 9/0897 713/169 |
| 2012/0210141 | A1* | 8/2012 | Morita .................... G06F 21/77 713/194 |

* cited by examiner

*Primary Examiner* — Beemnet Dada
(74) *Attorney, Agent, or Firm* — Chip Law Group

(57) ABSTRACT

There is provided an information processing device including an information storage unit configured to store information about a state in which a first secret key used during authentication is held in devices, and information about connection between the devices, and a communication unit configured to send the first secret key so that the first secret key is delivered to the devices based on the information stored in the information storage unit.

16 Claims, 13 Drawing Sheets

FIG.2
| DEVICE ID | DEVICE SECRET KEY | AUTHENTICATION SECRET KEY |
|---|---|---|
|  M | $K_A, K_B, K_C,$ $K_D, K_E, K_S$ | $K_1, K_2, K_3,$ $K_4, K_5, K_6$ |
| 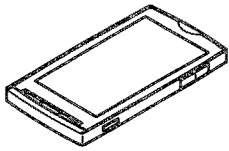 A | $K_A, K_S$ | $K_1, K_2, K_3,$ $K_4, K_5, K_6$ |
| 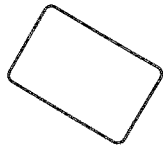 B | $K_B, K_S$ | $K_1, K_2, K_3, K_4$ |
|  C | $K_C, K_S$ | $K_1, K_2, K_3, K_4$ |
| 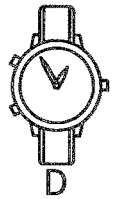 D | $K_D, K_S$ | $K_2$ |
|  E | $K_E, K_S$ | $K_2, K_4, K_5, K_6$ |

|       | A | B | C | D | E |
|-------|---|---|---|---|---|
| Key 1 | 1 | 1 | 1 | 0 | 0 |
| Key 2 | 1 | 1 | 1 | 1 | 1 |
| Key 3 | 1 | 1 | 1 | 0 | 0 |
| Key 4 | 1 | 1 | 1 | 0 | 1 |
| Key 5 | 1 | 0 | 0 | 0 | 1 |
| Key 6 | 1 | 0 | 0 | 0 | 1 |

|   | A | B | C | D | E |
|---|---|---|---|---|---|
| A | 1 | 1 | 0 | 1 | 1 |
| B | 0 | 1 | 0 | 0 | 0 |
| C | 0 | 0 | 1 | 0 | 0 |
| D | 1 | 0 | 1 | 1 | 0 |
| E | 0 | 0 | 0 | 0 | 1 |

|   | A | B | C | D | E |
|---|---|---|---|---|---|
| A | 1 | 1 | 1 | 1 | 1 |
| B | 0 | 1 | 0 | 0 | 0 |
| C | 0 | 0 | 1 | 0 | 0 |
| D | 1 | 1 | 1 | 1 | 1 |
| E | 0 | 0 | 0 | 0 | 1 |

⟨Key1 : v : B, C, E⟩,
- DEVICE ID FOR WHICH KEY ADDITION OR UPDATE HAS NOT BEEN COMPLETED
- VERSION OF KEY
- AUTHENTICATION SECRET KEY ID TO BE ADDED OR UPDATED

INFORMATION PROCESSING DEVICE AND INFORMATION PROCESSING METHOD TO MAINTAIN SECRET KEY FOR AUTHENTICATION

CROSS REFERENCE TO RELATED APPLICATIONS

This application claims the benefit of Japanese Priority Patent Application JP 2013-254030 filed Dec. 9, 2013, the entire contents of which are incorporated herein by reference.

BACKGROUND

The present disclosure relates to information processing devices, information processing methods, and computer programs.

Because of the widespread use of small-size and high-performance mobile telephones called smartphones and the advent of small-size devices called wearable devices, which can be put on the arm, face, etc., there are increasing opportunities to use these devices as an authentication device for authentication to obtain various services.

A service is contemplated in which a public facility, a company, etc., temporarily lends an authentication device to a user to allow the user to use a system without associating the individual to the authentication device. For example, an authentication device might be temporarily lent to a user in order to provide authentication to use equipment, such as a PC, etc., which is lent by a public facility or a company, or in order to unlock or lock the entrance to a facility. As the number of authentication devices thus increases, there is a demand for more efficient maintenance of secret keys for authentication. For example, JP 2000-224163A describes a technique of transmitting information for unlocking a door to enter a room between a plurality of keys and a plurality of locks to update the information.

SUMMARY

JP 2000-224163A above discloses a technique of causing all keys and locks to store and transmit all information which should be delivered. Therefore, in the technique disclosed in JP 2000-224163A above, as the number of keys or locks increases, the amount of information which should be delivered increases inevitably. Some keys may not have a chance to encounter some or most of the locks. Nevertheless, all information about access right is stored in each key and lock. Therefore, the amount of memory usage in each key and lock adversely increases, and also, the amount of communication traffic between each key and each lock adversely increases.

Therefore, the present disclosure proposes a novel and improved information processing device, information processing method, and computer program which can efficiently maintain a secret key for authentication by using information about connection between devices.

According to an embodiment of the present disclosure, there is provided an information processing device including an information storage unit configured to store information about a state in which a first secret key used during authentication is held in devices, and information about connection between the devices, and a communication unit configured to send the first secret key so that the first secret key is delivered to the devices based on the information stored in the information storage unit.

According to another embodiment of the present disclosure, there is provided an information processing method including storing information about a state in which a first secret key used during authentication is held in devices, and information about connection between the devices, and sending the first secret key so that the first secret key is delivered to the devices based on the stored information.

According to another embodiment of the present disclosure, there is provided a program for causing a computer to execute storing information about a state in which a first secret key used during authentication is held in devices, and information about connection between the devices, and sending the first secret key so that the first secret key is delivered to the devices based on the stored information.

As described above, according to the present disclosure, a novel and improved information processing device, information processing method, and computer program can be provided which can efficiently maintain a secret key for authentication by using information about connection between devices.

Note that the above advantages are not necessarily limiting. In addition to or instead of the above advantages, any of advantages described hereinafter or other advantages that will be understood from the following description, may be achieved.

BRIEF DESCRIPTION OF THE DRAWINGS

FIG. 2 is a diagram for describing example secret keys possessed by devices according to this embodiment;

DETAILED DESCRIPTION OF THE EMBODIMENT(S)

Figure 1:
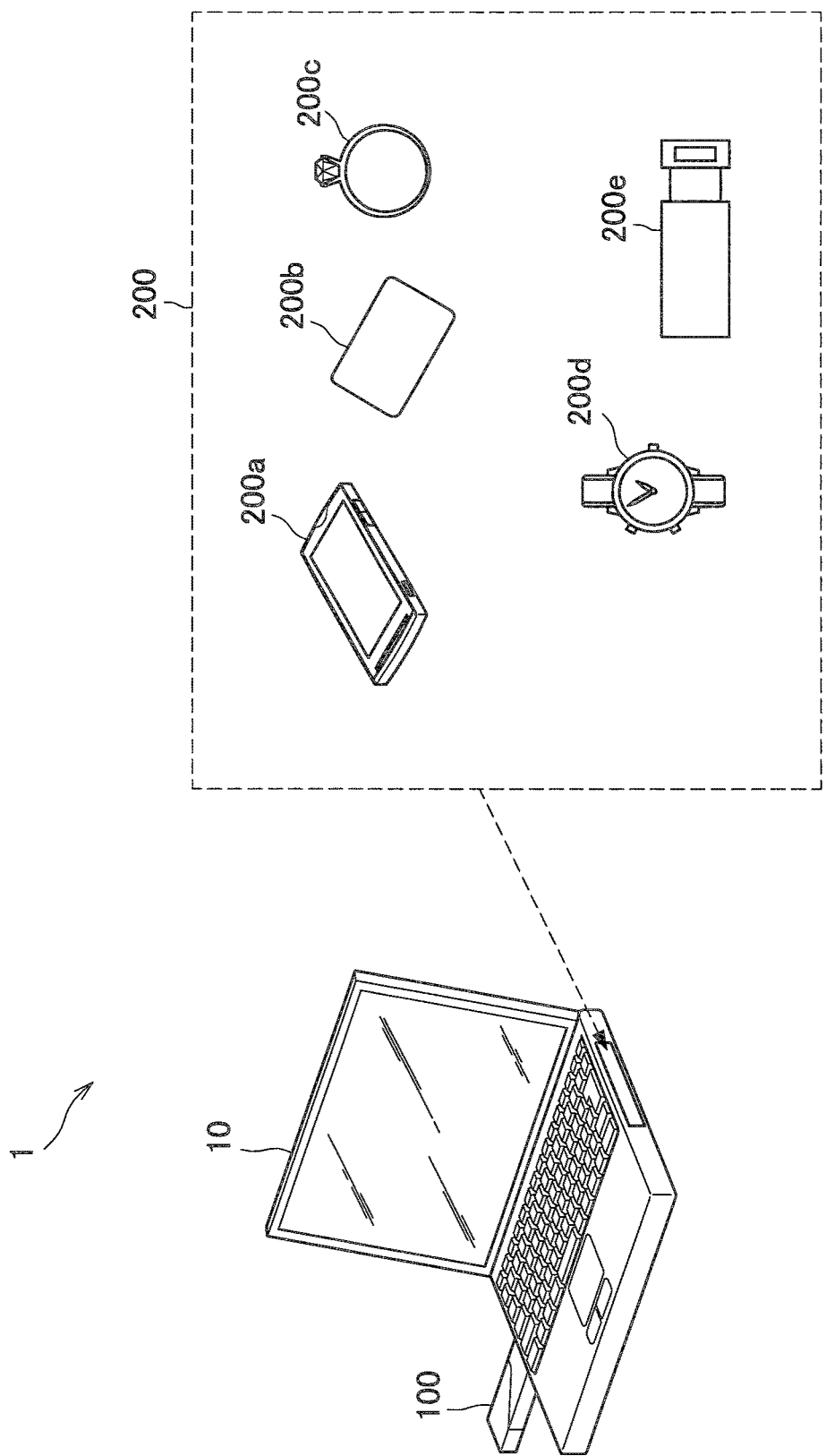
FIG. 1 is a diagram for describing an example configuration of an information processing system including an information processing device according to one embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. One Embodiment of Present Disclosure
1. 1. Example System Configuration
1. 2. Example Functional Configuration
1. 3. Example Operation
2. Example Hardware Configuration
3. Summary

1. One Embodiment of Present Disclosure

[1. 1. Example System Configuration]

As an authentication device which is used for authentication to obtain various services, not only devices which can connect to a network, such as a smartphone, etc., but also accessories, such as a ring, watch, etc., which are put on the body all the time and difficult to connect to a network, seem to be increasingly popular. These mobile devices may be changed daily or depending on the destination or purpose of going out. As a result, individuals may possess a plurality of authentication devices. It is also contemplated that services or functions which are permitted by authentication may be frequently changed or added, and secret keys for authentication may also be frequently added or updated in connection with the change or addition of services or functions. Therefore, one embodiment of the present disclosure shows a technique of easily maintaining secret keys for authentication with respect to such authentication devices. Firstly, an example system configuration according to one embodiment of the present disclosure will be described. FIG. 1 is a diagram for describing an example configuration of an information processing system including an information processing device according to one embodiment of the present disclosure. The example configuration of the information processing system will now be described with reference to FIG. 1.

As shown in FIG. 1, the information processing system 1 including the information processing device according to one embodiment of the present disclosure includes a PC 10, a master authentication device 100, and authentication devices 200. In the example of FIG. 1, the authentication devices 200 include five authentication devices 200a, 200b, 200c, 200d, and 200e.

The information processing system 1 of FIG. 1 authenticates the user by using a secret key (also referred to as an "authentication secret key") held in an authentication devices 200 before allowing a user to use the PC 10, for example. The authentication secret keys held in the authentication devices 200 are managed and distributed to the authentication devices 200 by the master authentication device 100. The master authentication device 100 manages authentication secret keys used for all services with respect to the authentication devices 200.

FIG. 1 illustrates that the authentication device 200a is a smartphone, the authentication device 200b is an IC card, the authentication device 200c is a ring, the authentication device 200d is a watch, and the authentication device 200e is a USB flash drive. The authentication device 200 is not limited to these examples. The authentication device 200 may, for example, be a tablet-type mobile terminal, or alternatively, something that a human wears, such as a bracelet, necklace, glasses, etc.

Although, in this embodiment, for example, the authentication devices 200 are used in authentication which is performed before the user is allowed to use the PC 10, the present disclosure is not limited to this example. For example, needless to say, the present disclosure is applicable to a system which allows a user to log in to a web service using the PC 10, or a system which allows a user to unlock and lock a door, etc.

In the foregoing, an example system configuration according to one embodiment of the present disclosure has been described. Terms used herein will now be defined.

(Authentication Secret Key)

A secret key which is used when authentication is performed during use of a service using an authentication device 200, is referred to as an "authentication secret key" in this embodiment. The authentication secret key may be one that is used in any of password authentication, public-key cryptography, symmetric-key cryptography, etc. In password authentication, the authentication secret key is a password. In public-key cryptography, the authentication secret key is a secret key paired with a public key possessed by a party which performs authentication. In symmetric-key cryptography, the authentication secret key is a private key which is common to a party which is subjected to authentication and a party which performs authentication.

(Device Secret Key)

A secret key which is specific to each authentication device 200 and is used in encryption and decryption of the above authentication secret key is referred to as a "device secret key" in this embodiment. The device secret key is held in the master authentication device 100 in addition to the authentication device 200.

Note that a device secret key common to all the information processing system 1 may be held in the master authentication device 100 and the authentication devices 200. If the device secret key common to all the information processing system 1 is held in the master authentication device 100 and the authentication devices 200, authentication secret keys can be encrypted and decrypted using the device secret key as described below.

In the description that follows, a device secret key is represented by $K_X$ (X is a letter of the alphabet), and an authentication secret key is represented by $K_I$ (I is an integer). The device secret keys possessed by the authentication devices 200a, 200b, 200c, 200d, and 200e are represented by $K_A$, $K_B$, $K_C$, $K_D$, and $K_E$, respectively. The device secret key common to all the information processing system 1 is represented by $K_S$.

(Authentication Secret Key List)

A list of the device secret keys and the authentication secret keys possessed by the authentication devices 200 is referred to as an "authentication secret key list" in this embodiment. This authentication secret key list is held only in the master authentication device 100. FIG. 2 is a diagram for describing example secret keys possessed by the master authentication device 100 and the authentication devices 200a, 200b, 200c, 200d, and 200e according to this embodiment. FIG. 2 shows which of the secret keys is held in the master authentication device 100 and each authentication device 200.

In the example of FIG. 2, the master authentication device 100 holds all of the device secret keys $K_A$, $K_B$, $K_C$, $K_D$, and $K_E$, and the device secret key $K_S$ common to all the information processing system 1.

Also in the example of FIG. 2, the authentication device 200a holds the device secret keys $K_A$ and $K_S$. Similarly, the authentication devices 200b-200e each hold a device secret key specific to itself and the device secret key $K_S$ common to all the information processing system 1.

In the example of FIG. 2, the master authentication device 100 holds all of the authentication secret keys $K_1$, $K_2$, $K_3$, $K_4$, $K_5$, and $K_6$. Also in the example of FIG. 2, the authentication device 200a also holds all of the authentication secret keys $K_1$, $K_2$, $K_3$, $K_4$, $K_5$, and $K_6$.

In the example of FIG. 2, the authentication devices 200b and 200c each hold the authentication secret keys $K_1$, $K_2$, $K_3$, and $K_4$, the authentication device 200d holds only the authentication secret key $K_2$, and the authentication device 200e holds the authentication secret keys $K_2$, $K_4$, $K_5$, and $K_6$.

Figures 3, 4:
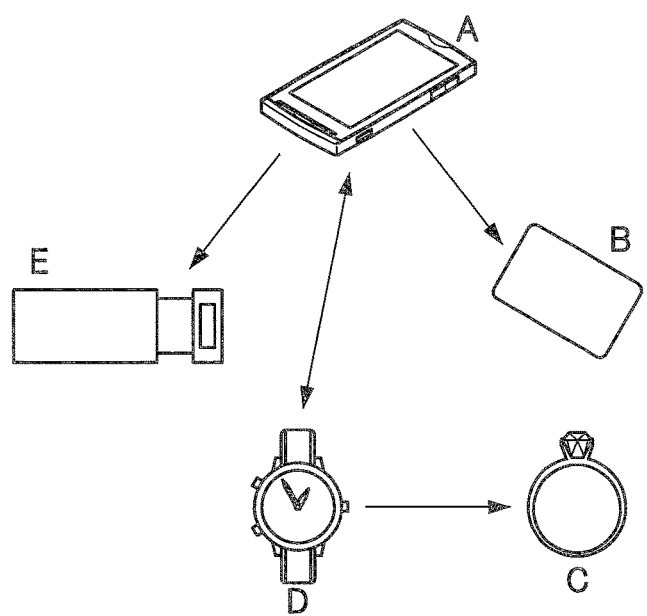
FIG. 3 is a diagram for describing an example authentication secret key list.
FIG. 4 is a diagram for describing example directions in which authentication secret keys are sent.

FIG. 3 is a diagram for describing an example authentication secret key list which is generated from the example secret keys possessed by the master authentication device 100 and the authentication devices 200a, 200b, 200c, 200d, and 200e of FIG. 2. The authentication secret key list of FIG. 3, which is held only by the master authentication device 100 as described above, is a table which describes device IDs for identifying the authentication device 200a, 200b, 200c, 200d, and 200e in the horizontal direction, and authentication secret key IDs for identifying the authentication secret keys in the vertical direction.

The device IDs for identifying the authentication devices 200a, 200b, 200c, 200d, and 200e are represented by A, B, C, D, and E, respectively. The authentication secret key IDs for identifying the authentication secret keys $K_1$, $K_2$, $K_3$, $K_4$, $K_5$, and $K_6$ are represented by Key 1, Key 2, Key 3, Key 4, Key 5, and Key 6, respectively. Also in the authentication secret key list of FIG. 3, "0" indicates that no authentication secret key is held, and "1" indicates that an authentication secret key is held.

In the authentication secret key list of FIG. 3, the authentication device 200a whose device ID is A holds all of the authentication secret keys $K_1$, $K_2$, $K_3$, $K_4$, $K_5$, and $K_6$ whose authentication secret key IDs are Key 1, Key 2, Key 3, Key 4, Key 5, and Key 6. The other authentication devices 200b-200e are similar to the authentication device 200a. Specifically, the authentication device 200b whose device ID is B and the authentication device 200c whose device ID is C each hold the authentication secret keys $K_1$, $K_2$, $K_3$, and $K_4$ whose authentication secret key IDs are Key 1, Key 2, Key 3, and Key 4. The authentication device 200d whose device ID is D holds only the authentication secret key $K_2$ whose authentication secret key ID is Key 2. The authentication device 200e whose device ID is E holds the authentication secret keys $K_2$, $K_4$, $K_5$, and $K_6$ whose authentication secret key IDs are Key 2, Key 4, Key 5, and Key 6.

The authentication secret key list is sent from a device which sends an authentication secret key or a device which receives an authentication secret key to the other device in response to the occurrence of a predetermined trigger. For example, the predetermined trigger may be the completion of a mutual authentication process between devices which communicate an authentication secret key with each other. In the description that follows, for example, the trigger for sending of the authentication secret key list is the completion of a mutual authentication process between devices which communicate an authentication secret key with each other. Alternatively, for example, the trigger for sending of the authentication secret key list may be an explicit input of an instruction by a user.

(Adjacent Device List)

A list which indicates whether or not authentication devices are directly connected together based on a connection scheme (e.g., NFC, Bluetooth, USB, etc.) with which the authentication devices are compliant so that an authentication secret key can be directly communicated between the authentication devices, is referred to as an "adjacent device list" in this embodiment. The adjacent device list is held only by the master authentication device 100 in this embodiment.

FIG. 4 is a diagram for describing example directions in which the authentication secret keys of the authentication devices 200a, 200b, 200c, 200d, and 200e according to one embodiment of the present disclosure are sent. In FIG. 4, the authentication device 200a can send an authentication secret key to the authentication devices 200b, 200d, and 200e. Of the authentication devices 200b, 200d, and 200e, the authentication device 200a can receive an authentication secret key from the authentication device 200d, and cannot send an authentication secret key to the authentication device 200c.

Similarly, in FIG. 4, the authentication devices 200b and 200e can only receive an authentication secret key from the authentication device 200a. The authentication device 200c can only receive an authentication secret key from the authentication device 200d. In FIG. 4, the authentication device 200d can receive an authentication secret key from the authentication device 200a, and can send an authentication secret key to the authentication devices 200a and 200c.

Note that communication of information other than authentication secret keys may not be limited to the directions indicated by the arrows in FIG. 4. For example, as described below, when an authentication secret key is sent from the authentication device 200a to the authentication device 200b, mutual authentication is previously performed between the authentication device 200a and the authentication device 200b, and during the mutual authentication, a message is also sent from the authentication device 200b to the authentication device 200a.

Figures 5, 6, 7:
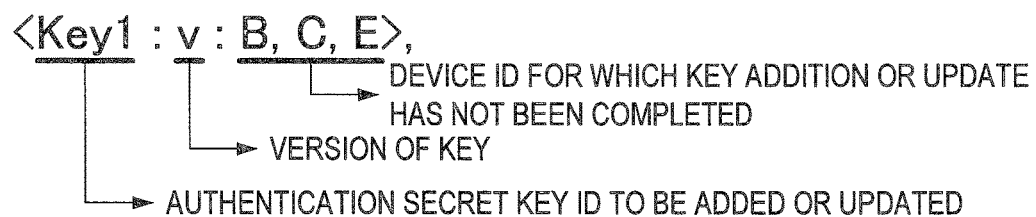
FIG. 5 is a diagram for describing an example adjacent device list.
FIG. 6 is a diagram for describing an example device connection list.
FIG. 7 is a diagram for describing an example key addition/update list.

FIG. 5 is a diagram for describing an example adjacent device list which is generated based on the directions in which authentication secret keys are sent as shown in FIG. 4. The adjacent device list, which is held only by the master authentication device 100, may be input and generated by a user who manages the information processing system 1.

The adjacent device list of FIG. 5 indicates that when the element in the row I and the column J is "1," an authentication secret key can be directly sent from the authentication device I to the authentication device J, and when the element is "0," an authentication secret key cannot be directly sent from the authentication device I to the authentication device J. Note that it is assumed that an authentication secret key can be directly sent within the same device. In other words, an element in any row and column having the same number (e.g., the element in the row I and the column I) is "1."

As can be seen from the adjacent device list of FIG. 5, the authentication device 200a whose device ID is A can directly send an authentication secret key to other authentication devices, i.e., 200b, 200d, and 200e. For the other authentication devices 200b, 200c, 200d, and 200e, it can be determined which of the authentication devices an authentication secret key can be directly sent to by referring to the adjacent device list of FIG. 5.

(Device Connection List)

Unlike the adjacent device list, a list which indicates whether or not an authentication secret key can be directly or indirectly sent between authentication devices, is referred to as a "device connection list" in this embodiment. The device connection list is held by the master authentication device 100 and the authentication devices 200a, 200b, 200c, 200d, and 200e in this embodiment.

FIG. 6 is a diagram for describing an example device connection list which is generated based on the directions in which authentication secret keys are sent as shown in FIG. 4. The device connection list may be input and generated by a user who manages the information processing system 1.

The device connection list of FIG. 6 indicates that when the element in the row I and the column J is "1," an authentication secret key can be directly or indirectly sent from the authentication device I to the authentication device J, and when the element is "0," an authentication secret key cannot be directly or indirectly sent from the authentication device I to the authentication device J. Note that it is assumed that an authentication secret key can be sent within the same device. In other words, an element in any row and column having the same number (e.g., the element in the row I and the column I) is "1."

As can be seen from the device connection list of FIG. 6, the authentication device 200a whose device ID is A can directly or indirectly send an authentication secret key to all the other authentication devices 200b, 200c, 200d, and 200e. For the other authentication devices 200b, 200c, 200d, and 200e, it can be determined which of the authentication devices an authentication secret key can be directly or indirectly sent to by referring to the device connection list of FIG. 6.

In the adjacent device list, the element in the row 1 and the column 3 is "0," i.e., the authentication device 200a whose device ID is A cannot directly send an authentication secret key to the authentication device 200c. However, the authentication device 200a can send an authentication secret key to the authentication device 200c through the authentication device 200d. Therefore, an authentication secret key can be indirectly sent from the authentication device 200a to the authentication device 200c, and therefore, the element in the row 1 and the column 3 is "1" in the device connection list of FIG. 6.

Similarly, in the adjacent device list, the element in the row 4 and the column 2 is "0," i.e., the authentication device 200b whose device ID is D cannot directly send an authentication secret key to the authentication device 200d. However, the authentication device 200d can send an authentication secret key to the authentication device 200b through the authentication device 200a. Therefore, an authentication secret key can be indirectly sent from the authentication device 200d to the authentication device 200b, and therefore, the element in the row 4 and the column 2 is "1" in the device connection list of FIG. 6.

(Key Addition/Update List)

A list which is generated when an authentication secret key is updated or added, or an authentication secret key is replaced with another authentication secret key, is referred to as a "key addition/update list" in this embodiment. The key addition/update list is generated by the master authentication device 100, and is held by the master authentication device 100 and the authentication devices 200a, 200b, 200c, 200d, and 200e.

FIG. 7 is a diagram for describing an example key addition/update list according to one embodiment of the present disclosure. The key addition/update list according to one embodiment of the present disclosure is generated in a format <(an authentication secret key ID):(a version number):(the devices ID of authentication devices for which addition/update of a key has not been completed)>. In other words, the key addition/update list is generated for each authentication secret key. The key addition/update list of FIG. 7 shows that, for an authentication secret key whose authentication secret key ID is Key 1 and whose version number is v2, update has not been completed in the authentication devices 200b, 200c, and 200e whose device IDs are B, C, and E.

The information processing system 1 according to one embodiment of the present disclosure has a feature that an authentication secret key is efficiently transmitted between authentication devices using a plurality of lists described above.

In the foregoing, terms used in this embodiment have been defined. Next, example functional configurations of the master authentication device 100 and the authentication device 200 according to one embodiment of the present disclosure will be described.

[1. 2. Example Functional Configuration]

Figure 8:
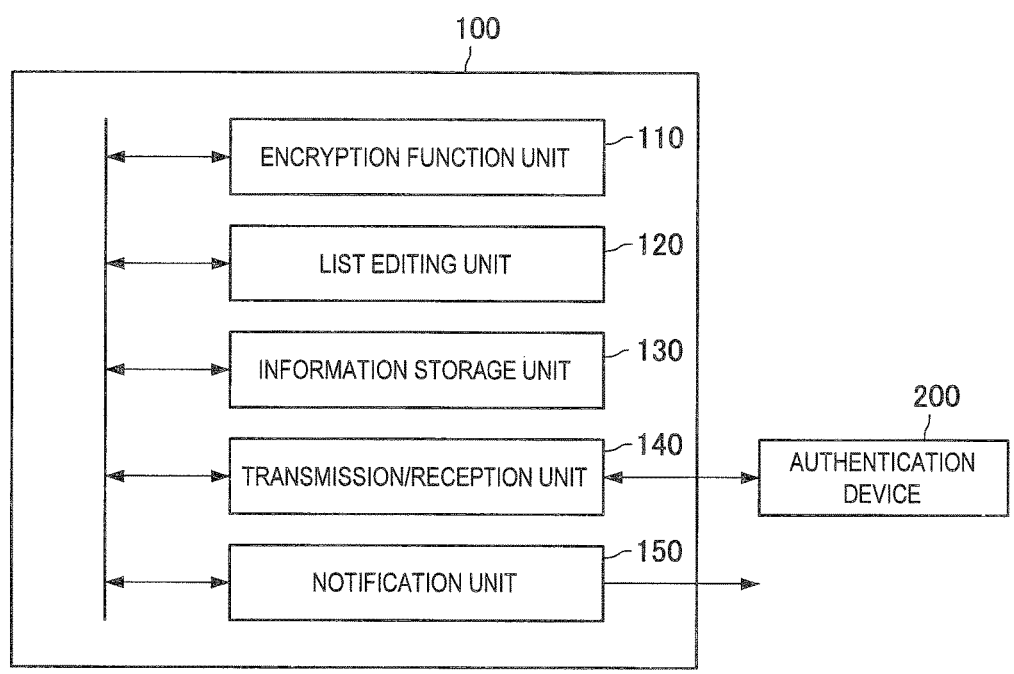
FIG. 8 is a diagram for describing an example functional configuration of a master authentication device according to one embodiment of the present disclosure.

FIG. 8 is a diagram for describing an example functional configuration of the master authentication device 100 according to one embodiment of the present disclosure. The example functional configuration of the master authentication device 100 according to one embodiment of the present disclosure will now be described with reference to FIG. 8.

As shown in FIG. 8, the master authentication device 100 according to one embodiment of the present disclosure includes an encryption function unit 110, a list editing unit 120, an information storage unit 130, a transmission/reception unit 140, and a notification unit 150.

The encryption function unit 110 performs an encryption process on an authentication secret key which is to be sent from the master authentication device 100 to an authentication device 200.

The list editing unit 120 performs an editing process on the adjacent device list, the device connection list, and the key addition/update list. In this embodiment, the list editing unit 120 particularly performs an editing process on the key addition/update list.

The information storage unit 130, which is an example information storage unit according to an embodiment of the present disclosure, stores the adjacent device list, the device connection list, and the key addition/update list. The information storage unit 130 may also hold device secret keys or authentication secret keys.

The transmission/reception unit 140 communicates with other devices, i.e., the PC 10 and the authentication devices 200. The transmission/reception unit 140 communicates with other devices through, for example, a wireless LAN, near field communication (NFC), Bluetooth (registered trademark), USB, etc. The transmission/reception unit 140 sends an authentication secret key encrypted by the encryption function unit 110 or the key addition/update list to other devices, or receives the key addition/update list from other devices.

The notification unit 150 performs a process of notifying of information. In this embodiment, if there is still an authentication device 200 for which addition or update of an authentication secret key has not been performed, the notification unit 150 performs a process of notifying of such a situation. Specifically, the notification unit 150 is an example information output unit according to an embodiment of the present disclosure. The notification unit 150 may include hardware, such as a liquid crystal display, organic EL display, LED indicator, loudspeaker, etc. The notification unit 150 may include software which performs a process of mailing information of an authentication device 200 for which addition or update of an authentication secret key has not been performed, or a process of displaying using a web application.

In the foregoing, an example functional configuration of the master authentication device 100 according to one embodiment of the present disclosure has been described with reference to FIG. 8. Next, an example functional configuration of the authentication device 200 according to one embodiment of the present disclosure will be described.

Figure 9:
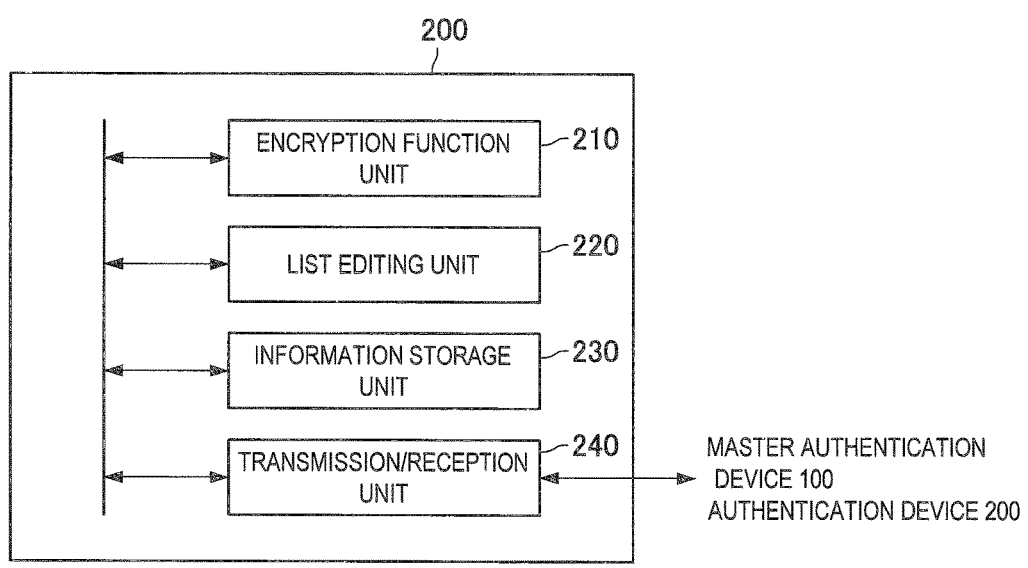
FIG. 9 is a diagram for describing an example functional configuration of an authentication device according to one embodiment of the present disclosure.

FIG. 9 is a diagram for describing an example functional configuration of the authentication device 200 according to one embodiment of the present disclosure. The example functional configuration of the authentication device 200 according to one embodiment of the present disclosure will now be described with reference to FIG. 9.

As shown in FIG. 9, the authentication device 200 according to one embodiment of the present disclosure includes an encryption function unit 210, a list editing unit 220, an information storage unit 230, and a transmission/reception unit 240.

The encryption function unit 210 performs a decryption process on an encrypted authentication secret key which has been sent from the master authentication device 100 to the authentication device 200. The encryption function unit 210 also performs an encryption process on an authentication secret key which is to be sent from the authentication device 200 to another authentication device 200.

The list editing unit 220 performs an editing process on the adjacent device list, the device connection list, and the key addition/update list. In this embodiment, the list editing unit 220 particularly performs an editing process on the key addition/update list.

The information storage unit 230, which is an example information storage unit according to an embodiment of the present disclosure, stores the adjacent device list, the device connection list, and the key addition/update list. The information storage unit 230 may also hold device secret keys or authentication secret keys.

The transmission/reception unit 240 communicates with other devices, i.e., the master authentication device 100 and another authentication device 200. The transmission/reception unit 240 communicates with other devices through, for example, a wireless LAN, NFC, Bluetooth (registered trademark), USB, etc. The transmission/reception unit 240 sends an authentication secret key encrypted by the encryption function unit 210 or the key addition/update list to other devices (the master authentication device 100 and another authentication device 200), or receives the key addition/update list from other devices.

In the foregoing, an example functional configuration of the authentication device 200 according to one embodiment of the present disclosure has been described with reference to FIG. 9. Next, an example operation of the information processing system 1 according to one embodiment of the present disclosure will be described.

[1. 3. Example System Operation]

Figure 10:
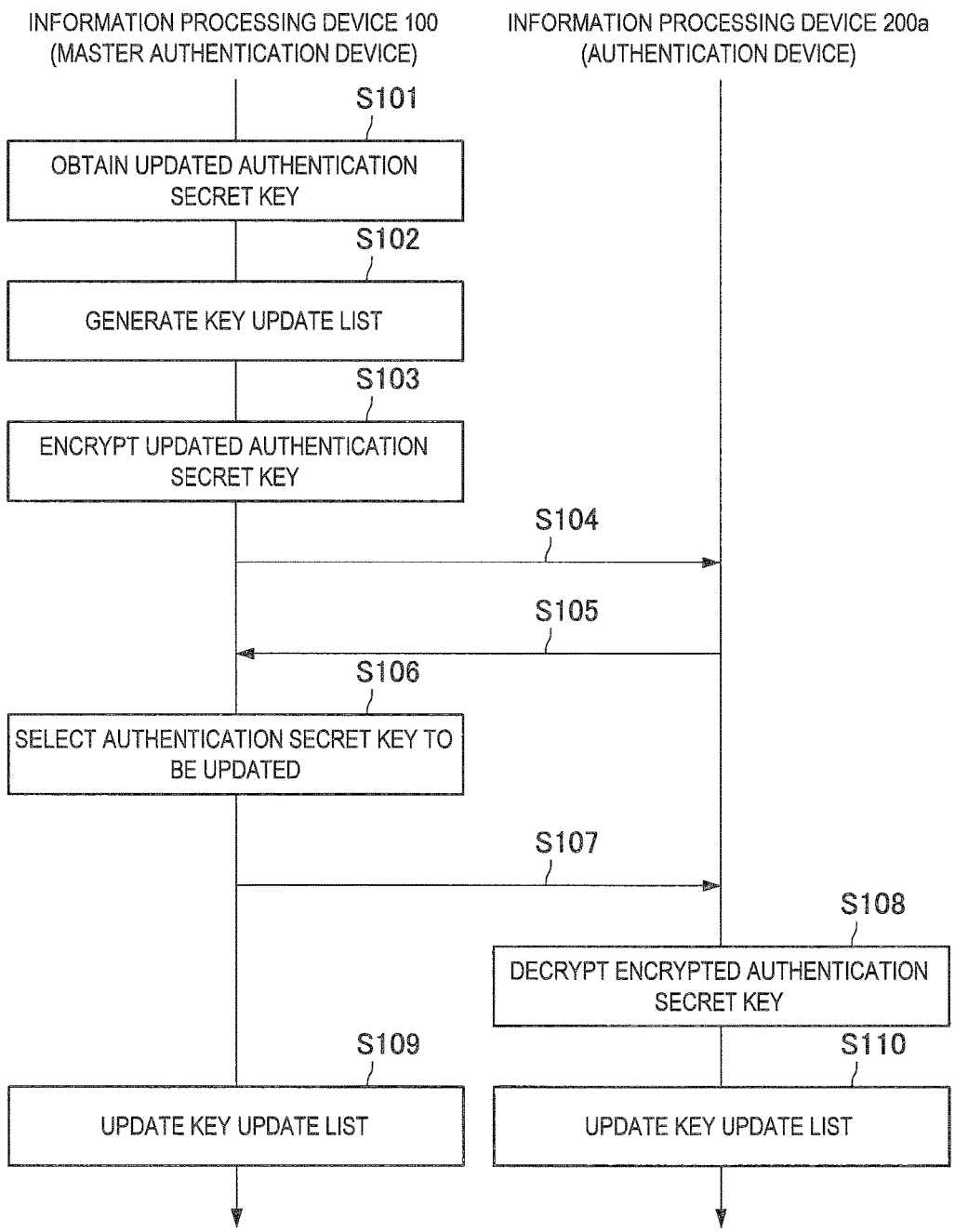
FIG. 10 is a sequence diagram for describing an example operation of an information processing system according to one embodiment of the present disclosure.

FIG. 10 is a sequence diagram for describing an example operation of the information processing system 1 according to one embodiment of the present disclosure. The example operation of FIG. 10 is performed when an authentication secret key whose authentication secret key ID is Key i is updated from $K_i$ to $K_i'$, and the updated authentication secret key is sent from the master authentication device 100 to the authentication device 200a. The example operation of the information processing system 1 according to one embodiment of the present disclosure will now be described with reference to FIG. 10.

For example, when an authentication secret key whose authentication secret key ID is Key 1, which is used by the authentication device 200a, has been updated from $K_1$ to $K_1'$ by the manager of the authentication secret key, etc., the master authentication device 100 obtains the updated authentication secret key $K_1'$ from, for example, the PC 10, etc. (step S101). The master authentication device 100 obtains the updated authentication secret key $K_1'$ by receiving it from, for example, the PC 10, etc., using the transmission/reception unit 140.

The master authentication device 100, when obtaining the updated authentication secret key $K_1'$ in step S101, then generates a key update list $L_{i,M}$ based on a device ID having Key i in order to allow the authentication device 200 to update the authentication secret key $K_1'$ (step S102). The process of generating the key update list in step S102 may, for example, be performed by the list editing unit 120. The subscript "i" of the key update list $L_{i,M}$ corresponds to the authentication secret key ID (here, Key 1), and M indicates that the key update list has been generated by the master authentication device.

In the authentication secret key list of FIG. 3, there are three devices having Key 1, whose device ID are A, B, and C. When the version of the authentication secret key to be updated is v2, the key update list is $L_{1,M}$=<Key 1:v2:A, B, C>.

The master authentication device 100, when generating the key update list in step S102, then encrypts the updated authentication secret key $K_1'$ obtained in step S101 (step S103). This encryption may, for example, be performed by the encryption function unit 110.

The master authentication device 100 may encrypt an authentication secret key using the device secret key of a device whose device ID is among the device IDs in the key update list $L_{i,M}$ for which key update has not been completed. Alternatively, the master authentication device 100 may also encrypt an authentication secret key using the system key $K_S$ and the key $K_i$ before update. In the former case, the same number of encrypted authentication secret keys as there are devices in which the authentication secret key to be updated is stored, are generated. On the other hand, in the latter case, there is only one encrypted authentication secret key.

The devices A, B, and C have the authentication secret key $K_1$ corresponding to Key 1. When the authentication secret key whose authentication secret key ID is Key 1 has been updated from $K_1$ to $K_1'$, the master authentication device 100 encrypts the updated authentication secret key $K_1'$ into Enc($K_A$, $K_1'$), Enc($K_B$, $K_1'$), and Enc($K_C$, $K_1'$) using the device secret keys $K_A$, $K_B$, and $K_C$ of the authentication device 200a, 200b, and 200c having the authentication secret key $K_1$. Enc(X, Y) means that information Y is encrypted using a key X. Alternatively, the master authentication device 100 may, for example, encrypt the updated authentication secret key $K_1'$ into Enc($K_1$+$K_S$, $K_1'$) ("+"

means the exclusive OR of two key bit strings) using the system key $K_S$ and the key $K_1$ before update.

After encrypting the authentication secret key $K_1'$ in step S103, the master authentication device 100 performs a mutual authentication process between itself and the authentication device 200a to which the master authentication device 100 is to send the authentication secret key $K_1'$ (step S104). The master authentication device 100 may use the system key $K_S$ in the mutual authentication process between itself and the authentication device 200a.

After performing the mutual authentication process between itself and the master authentication device 100 in step S104, the authentication device 200a sends all the authentication secret key IDs and version information to the master authentication device 100 (step S105). For example, the authentication device 200a sends the version information of each of the authentication secret key IDs=Key 1, . . . , and Key 6 to the master authentication device 100. When the version information of the authentication secret key ID=Key 1 is v1, the authentication device 200a sends information represented by <Key 1, v1> to the master authentication device 100.

The master authentication device 100, when receiving all the authentication secret key IDs and version information from the authentication device 200a, selects an authentication secret key ID to be updated, which has old version information, by referring to the key update list $L_{i, M}$ generated in step S102 (step S106). In this case, while the version information of the authentication secret key ID Key 1 sent from the authentication device 200a is v1, the version information of the authentication secret key ID Key 1 which is held by the master authentication device 100 is v2. Therefore, the master authentication device 100 selects Key 1 as an authentication secret key ID having old version information.

Next, the master authentication device 100 generates a key update list for the authentication device 200a based on the key update list corresponding to the selected authentication secret key ID. Specifically, the master authentication device 100 compares a device ID in the key update list for which key update has not been completed, with a device ID in the device connection list to which the authentication device 200a can send a signal, to select a device ID which is common to both of the lits (also referred to as a "common device ID").

For example, the device IDs of authentication devices in the key update list $L_{1, M}$=<Key 1:v2:A, B, C> for which key update has not been completed are A, B, and C. According to the device connection list of FIG. 6, the authentication device 200a whose device ID is A can connect to the authentication devices 200a, 200b, 200c, 200d, and 200e. Therefore, the master authentication device 100 selects the device IDs=A, B, and C, which are common to the authentication devices for which key update has not been completed and the authentication devices to which the authentication device 200a can connect.

Next, the master authentication device 100 generates a key update list $L_{i, X}$ based on the common devices ID. Device IDs in this key update list for which key update has not been completed are the above common device IDs. Thereafter, the master authentication device 100 sends an authentication secret key which has been encrypted using the encryption key of a device in the key update list for which key update has not been completed, or the system key and the authentication secret key before update, and the key update list $L_{i, X}$ to the authentication device 200a (step S107). Note that when all authentication secret keys have already been updated, the master authentication device 100 sends null information.

For example, the master authentication device 100 sends the encrypted authentication secret keys Enc($K_A$, $K_1'$), Enc($K_B$, $K_1'$), and Enc($K_C$, $K_1'$), or Enc($K_1+K_S$, $K_1'$), and the key update list $L_{1, A}$=<Key 1:v2:A, B, C>, to the authentication device 200a.

The authentication device 200a, when receiving the encrypted authentication secret key and the key update list $L_{1, A}$ from the master authentication device 100, determines whether or not its own device ID is included in the key update list $L_{1, A}$. If the result of the determination is positive, the authentication device 200a decrypts the authentication secret key based on the device secret key, or the system key and the authentication secret key before update, which are held by itself (step S108). The authentication device 200a stores the other encrypted authentication secret keys Enc($K_B$, $K_1'$) and Enc($K_C$, $K_1'$), or Enc($K_1+K_S$, $K_1'$) sent from the master authentication device 100.

The master authentication device 100 updates the key update list $L_{i, M}$ by deleting the device ID (X) of the authentication device 200 which has been sent, from the device IDs for which key update has not been completed (step S109). Specifically, the master authentication device 100 updates the key update list to $L_{1, M}$=<Key 1:v2:B, C>.

The authentication device 200a also updates the key update list $L_{i, X}$ by deleting its own device ID (X) from the device IDs for which key update has not been completed. Specifically, the authentication device 200a updates the key update list to $L_{1, A}$=<Key 1:v2:B, C> (step S110).

The master authentication device 100 can send an authentication secret key which has not been updated by the authentication device 200a by performing the above operation. Also, the authentication device 200a can receive an authentication secret key which has not been updated, from the master authentication device 100, by performing the above operation.

Note that, in the above example, the authentication secret key whose authentication secret key ID is Key 1 is updated from $K_1$ to $K_1'$ by the manager of the authentication secret key, etc. Even when an authentication secret key is replaced with another authentication secret key having a different authentication secret key ID, the master authentication device 100 and the authentication device 200a can perform replacement of an authentication secret key by a similar process.

Figure 11:
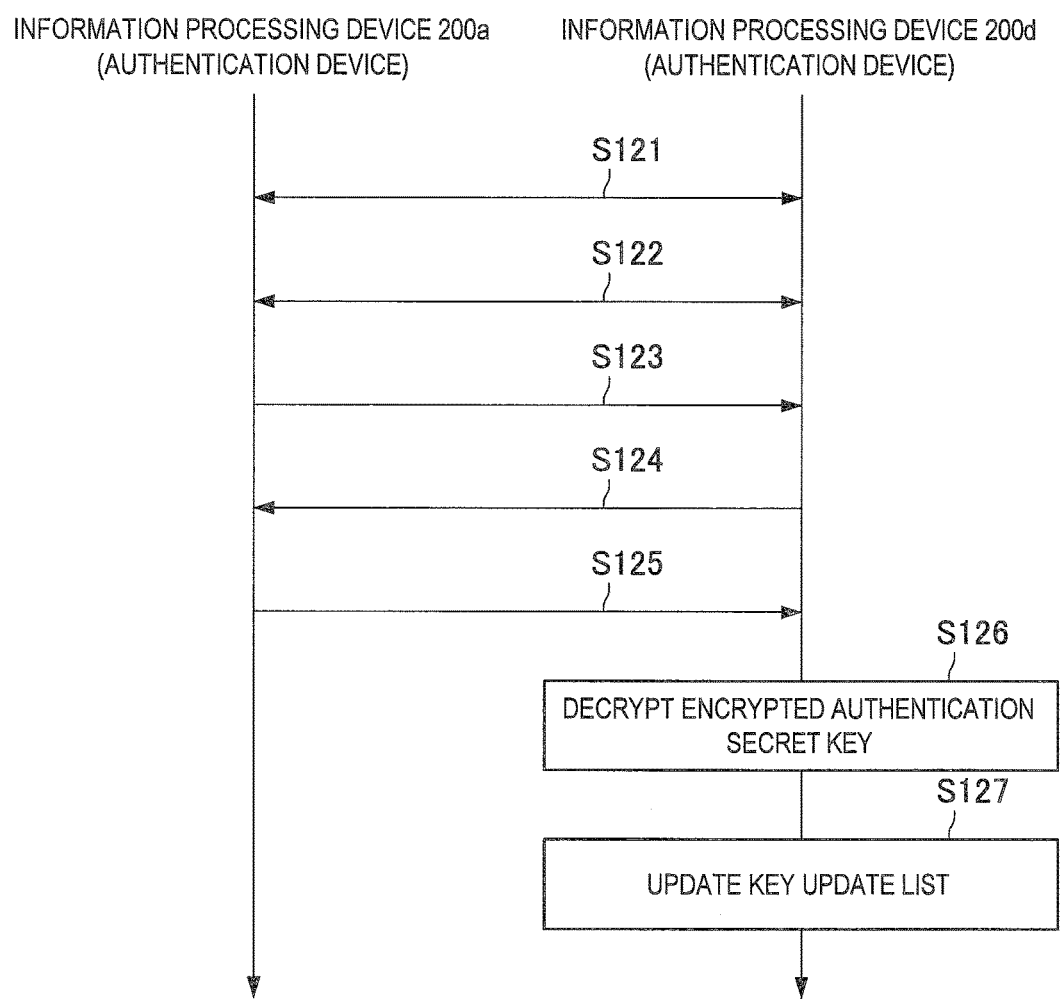
FIG. 11 is a sequence diagram for describing an example operation of an information processing system according to one embodiment of the present disclosure.

FIG. 11 is a sequence diagram for describing an example operation of the information processing system 1 according to one embodiment of the present disclosure. In the example operation of FIG. 11, when an authentication secret key whose authentication secret key ID is Key i has been updated from $K_i$ to $K_i'$, the updated authentication secret key is sent from the authentication device 200a to the authentication device 200d. The example operation of the information processing system 1 according to one embodiment of the present disclosure will now be described with reference to FIG. 11. Note that each process shown in FIG. 11 is assumed to be performed if the process of the sequence diagram of FIG. 10 has been completed, i.e., the authentication secret key whose authentication secret key ID is Key 1, of the authentication device 200a, has been updated from $K_1$ to $K_1'$.

Initially, the authentication device 200a and the authentication device 200d are caused to be ready to communicate with each other (step S121). For example, in the case of USB, the ready state is established by connecting the devices together. In the case of Bluetooth (registered trademark) or active NFC, the ready state is established by causing one device to be in a state in which the device can be searched for while causing the other device to be in a state in which the device is performing search. In the case of passive NFC, the ready state is established by causing one device to be in a state in which the device is performing search. Thereafter, one authentication device determines an authentication device to which that authentication device sends a signal with priority.

When the authentication device 200a and the authentication device 200d are caused to be ready in step S121, then the authentication device 200a and the authentication device 200d perform a mutual authentication process (step S122). The authentication device 200a and the authentication device 200d may perform the mutual authentication process using the system key $K_S$.

After performing the mutual authentication process with the authentication device 200d in step S122, the authentication device 200a sends all the authentication secret key IDs and version information to the authentication device 200d (step S123). For example, the authentication device 200a sends all the versions of the authentication secret key IDs=Key 1, . . . , and Key 6 to the authentication device 200d. In the process of the sequence diagram of FIG. 10, an authentication secret key whose authentication secret key ID is Key 1, of the authentication device 200a, has been updated to version v2. Therefore, as a piece of version information, the authentication device 200a sends, for example, <Key 1:v2> to the authentication device 200d.

The authentication device 200d receives the authentication secret key IDs and the version information from the authentication device 200a, and compares the versions of the authentication secret keys with those stored in itself. Thereafter, the authentication device 200d selects a list having an old key version. Specifically, the authentication device 200d, when receiving the information <Key 1:v2> from the authentication device 200a, compares the information <Key 1:v2> with the version of the authentication secret key whose authentication secret key ID is Key 1, of itself After selecting the list having an old key version, the authentication device 200d sends the authentication secret key ID having the old key version and the updated version information (step S124). Specifically, the authentication device 200d sends the information <Key 1:v2> to the authentication device 200a.

The authentication device 200a, when receiving the authentication secret key ID and the version information of the authentication secret key from the authentication device 200d, compares a device ID for which key update has not been completed in the key update list related to the authentication secret key ID which is possessed by the authentication device 200a, with a device ID in the device connection list to which the authentication device 200d can send a signal. The authentication device 200a extracts a device ID common to both of the lists. Thereafter, the authentication device 200a newly generates a key update list $L_{i,\,D}$ which is to be sent from the authentication device 200a to the authentication device 200d. In the key update list $L_{i,\,D}$, the key version is changed to the new version, and the device for which key update has not been completed is changed to the common device ID.

The authentication device 200a also selects an authentication secret key encrypted using the secret key of the common device ID from the encrypted authentication secret keys, and sends that encrypted authentication secret key together with the key update list $L_{i,\,D}$ to the authentication device 200d. If there is at least one common device ID, the authentication device 200a sends the encrypted authentication secret key after update together with the key update list $L_{i,\,D}$. If there is no common device ID, the authentication device 200a sends only the list having the null device ID field to the authentication device 200d.

Specifically, for the authentication secret key ID Key 1 of the authentication device 200a, devices for which key update has not been completed in the key update list $L_{1,\,A}$ are B and C. The device IDs of authentication devices to which the authentication device 200d can send a signal are A, B, C, D, and E. Therefore, the common device IDs are B and C. Therefore, the authentication device 200a sends a key update list $L_{1,\,D}$=<Key 1:v2:B, C>, and encrypted authentication secret keys $Enc(K_B, K_1')$ and $Enc(K_C, K_1')$, or an encrypted authentication secret key $Enc(K_1+K_S, K_1')$, to the authentication device 200d.

The authentication device 200d, when its own device ID is included in the key update list $L_{1,\,D}$ sent from the authentication device 200a, decrypts the authentication secret key after update based on its own device secret key $K_D$, or the system key $K_S$ and the authentication secret key $K_1$ before update. Note that, here, the device ID (D) of the authentication device 200d is not included in the key update list $L_{1,\,D}$ sent from the authentication device 200a, and therefore, the authentication device 200d does not perform the decryption process.

The authentication device 200d updates the key update list $L_{1,\,D}$ by deleting its own device ID (D) from the device IDs in the key update list $L_{1,\,D}$ for which key update has not been completed. Note that, in this example, the device ID (D) of the authentication device 200d is not included in the key update list $L_{1,\,D}$ sent from the authentication device 200a, and therefore, the authentication device 200d does not update the key update list $L_{1,\,D}$. The authentication device 200d also stores the device secret key of a device for which key update has not been completed, or the system key and an authentication secret key encrypted using the authentication secret key before update. Specifically, the authentication device 200d stores the authentication secret keys $Enc(K_B, K_1')$ and $Enc(K_C, K_1')$, or the authentication secret key $Enc(K_1+K_S, K_1')$.

The authentication device 200a and the authentication device 200d can communicate an authentication secret key with each other. Therefore, when the authentication device 200d updates the key update list $L_{1,\,D}$, then the authentication device 200d sends the authentication secret key to the authentication device 200a. Thereafter, processes similar to the processes of steps S124 to S127 are performed between the authentication device 200a and the authentication device 200d, where the sender and the receiver are switched. By performing the above operation, the authentication device 200a and the authentication device 200d can mutually transmit an authentication secret key which has not been updated.

FIGS. 10 and 11 show the process which is performed when an updated authentication secret key is transmitted from the master authentication device 100 to an authentication device 200, or between authentication devices 200. In addition, by a similar process, a newly added authentication secret key may be transmitted from the master authentication device 100 to an authentication device 200, or between authentication devices 200.

For example, a case will be described in which, as shown in FIG. 3, the authentication secret key $K_6$ whose authentication secret key ID is Key 6 is added to authentication devices 200 whose device IDs are A and E, i.e., the authentication devices 200a and 200e. In the description that follows, a process of transmitting an added authentication secret key will be described with reference to the sequence diagrams of FIGS. 10 and 11.

Initially, the master authentication device 100 obtains the added authentication secret key $K_6$ from, for example, the PC 10, etc. (step S101). After obtaining the added authentication secret key in step S101, the master authentication device 100 generates a key addition list $L_{6,\ M}$ in order to add the authentication secret key to the authentication device 200 (step S102). The key addition list $L_{6,\ M}$ is <Key 6:v1:A, E>.

After generating the key addition list in step S102, the master authentication device 100 encrypts the added authentication secret key $K_6$ obtained in step S101 (step S103). This encryption may, for example, be performed by the encryption function unit 110. The master authentication device 100 encrypts the authentication secret key using the key of an authentication device 200 included in device IDs for which key addition has not been completed in the key addition list $L_{6,\ M}$. Specifically, the master authentication device 100 encrypts the added authentication secret key $K_6$ to obtain $Enc(K_A, K_6)$ and $Enc(K_E, K_6)$.

After encrypting the added authentication secret key $K_6$ in step S103, the master authentication device 100 performs a mutual authentication process between itself and the authentication device 200a to which the authentication secret key is to be sent (step S104). The master authentication device 100 uses the system key $K_S$ in the mutual authentication process with the authentication device 200a.

After performing the mutual authentication process with the master authentication device 100 in step S104, the authentication device 200a sends all authentication secret key IDs and version information to the master authentication device 100 (step S105). The master authentication device 100, when receiving all the authentication secret key IDs and version information from the authentication device 200a, selects the authentication secret key $K_6$ whose authentication secret key ID is Key 6, which is not possessed by the authentication device 200a, by referring to the key addition list $L_{6,\ M}$ (step S106).

Next, the master authentication device 100 generates a key addition list for the authentication device 200a based on a key update list corresponding to the selected authentication secret key ID. The device IDs for which key addition has not been completed in the authentication secret key list $L_{6,M}$=<Key 6:v1:A, E> are A and E. According to the device connection list of FIG. 6, authentication devices to which the authentication device 200a whose device ID is A can connect are the authentication devices 200a, 200b, 200c, 200d, and 200e. Therefore, the master authentication device 100 selects the device IDs=A and E, which are common to both of the lists.

Next, the master authentication device 100 generates a key addition list $L_{6,\ A}$ based on the common device IDs. Device IDs for which key addition has not been completed in the key update list are the above common device IDs. Thereafter, the master authentication device 100 sends the added authentication secret key $K_6$ encrypted using an encryption key of the device for which key addition has not been completed in the key addition list, and the key addition list $L_{6,\ A}$, to the authentication device 200a (step S107).

For example, the master authentication device 100 sends the encrypted authentication secret keys $Enc(K_A, K_6)$ and $Enc(K_E, K_6)$, and the key update list $L_{6,\ A}$=<Key 6:v1:A, E>, to the authentication device 200a.

The authentication device 200a, when receiving the encrypted authentication secret key $K_6$ and the key addition list $L_{6,\ A}$ from the master authentication device 100, determines whether or not its own device ID is included in the received key addition list $L_{6,\ A}$. If the result of the determination is positive, the authentication device 200a decrypts the authentication secret key $K_6$ based on the device secret key held by itself (step S108). The authentication device 200a stores the other encrypted authentication secret key $Enc(K_E, K_6)$ sent from the master authentication device 100.

The master authentication device 100 updates the key update list $L_{6,\ M}$ by deleting the device ID (A) of the sender authentication device 200 from the device IDs for which key addition has not been completed in the key addition list $L_{6,\ M}$ (step S109). Specifically, the master authentication device 100 updates the key update list $L_{6,\ M}$ to <Key 6:v1:E>.

The authentication device 200a also updates the key addition list $L_{6,\ M}$ by deleting its own device ID (A) from the device IDs for which key addition has not been completed in the key addition list $L_{6,\ M}$. Specifically, the authentication device 200a updates the key addition list $L_{6,\ M}$ to <Key 6:v1:E> (step S110).

By performing the above operation, the master authentication device 100 can send an authentication secret key which has not been added to the authentication device 200a. By performing the above operation, the authentication device 200a can receive an authentication secret key which has not been added from the master authentication device 100.

Next, an operation which is performed when the newly added authentication secret key $K_6$ is transmitted between authentication devices 200, will be described. Note that, in the description that follows, it is assumed that the authentication device 200d of FIG. 11 is replaced with the authentication device 200e.

Initially, the authentication device 200a and the authentication device 200e are caused to be ready to communicate with each other (step S121). Next, the authentication device 200a and the authentication device 200e perform a mutual authentication process (step S122). The authentication device 200a and the authentication device 200e performs a mutual authentication process using the system key $K_S$.

After performing the mutual authentication process with the authentication device 200e in step S122, the authentication device 200a sends all the authentication secret key IDs and version information to the authentication device 200e (step S123). For example, the authentication device 200a sends all the versions of the authentication secret key IDs=Key 1, . . . , and Key 6 to the authentication device 200e. As a piece of version information, the authentication device 200a sends, for example, <Key 6:v1> to the authentication device 200e.

The authentication device 200e receives the authentication secret key IDs and the version information from the authentication device 200a, and compares the versions of the authentication secret keys with those stored in itself. Thereafter, the authentication device 200e selects a list of authentication secret keys which are not held by itself. Specifically, the authentication device 200e, when receiving the information <Key 6:v1> from the authentication device 200a, can recognize that Key 6 is not stored in itself.

After selecting the list of authentication secret keys which are not held by itself, the authentication device 200e sends the authentication secret key ID of an authentication secret key which is not held by itself (step S124). Specifically, the authentication device 200e sends the information <Key 6> to the authentication device 200a.

The authentication device 200a, when receiving the authentication secret key ID which has not been added from the authentication device 200e, compares a device ID for which key addition has not been completed in a key addition list related to the authentication secret key ID, which is possessed by the authentication device 200a, with a device ID to which the authentication device 200e can send a signal in the device connection list. The authentication device 200a extracts a device ID common to both of the lists. Thereafter, the authentication device 200a newly generates a key addition list $L_{6,\ E}$, which is to be sent from the authentication device 200a to the authentication device 200d. In the key addition list $L_{6,\ E}$, the key version is set to "v1," and the devices for which key addition has not been completed are set to the above common device IDs.

The authentication device 200a also selects an authentication secret key encrypted using the secret key of the common device ID from the encrypted authentication secret keys, and sends that encrypted authentication secret key together with the key addition list $L_{6,\ E}$ to the authentication device 200e. If there is at least one common device ID, the authentication device 200a sends the encrypted authentication secret key which is to be newly added together with the key addition list $L_{6,\ E}$. If there is no common device ID, the authentication device 200a sends only the list having the null device ID field to the authentication device 200e.

Specifically, for the authentication secret key ID Key 6 of the authentication device 200a, a device for which key addition has not been completed in the key addition list $L_{6,\ E}$ is E. The device IDs of authentication devices to which the authentication device 200e can send a signal are A, B, C, D, and E. Therefore, a device ID common to both of the lists is E. Therefore, the authentication device 200a sends the key update list $L_{6,\ E}$=<Key 6:v1:E> and the encrypted authentication secret key Enc($K_E$, $K_6$) to the authentication device 200e.

The authentication device 200e, when its own device ID (E) is included in the key addition list $L_{6,\ E}$ sent from the authentication device 200a, decrypts the authentication secret key $K_6$ to be added based on the device secret key $K_E$ held by itself.

The authentication device 200e updates the key addition list $L_{6,\ E}$ by deleting its own device ID (E) from the device IDs for which key addition has not been completed in the key addition list $L_{6,\ E}$. The authentication device 200e also stores an authentication secret key encrypted using the device secret key of a device for which key addition has not been completed. However, in this example, there is no other encrypted authentication secret keys, and therefore, the authentication device 200e stores no other encrypted authentication secret keys.

The authentication device 200a and the authentication device 200e cannot communicate an authentication secret key with each other. Therefore, when the authentication device 200e has updated the key addition list $L_{6,\ E}$, the above series of processes is ended.

By performing the above operation, the authentication device 200a and the authentication device 200e can transmit an authentication secret key which has not been added from the authentication device 200a to the authentication device 200e.

As described above, the information processing system 1 according to one embodiment of the present disclosure can transmit an authentication secret key which has been updated or added, from the master authentication device 100 to an authentication device 200, or between authentication devices 200. However, as the number of authentication devices 200 increases, some authentication secret keys may fail to be added or updated with respect to some authentication devices 200. Therefore, the information processing system 1 according to one embodiment of the present disclosure has a feature that key addition/update lists are transmitted and collected in the master authentication device 100, whereby it is easy to find any authentication device 200 in which an authentication secret key has not been added or updated.

Figure 12:
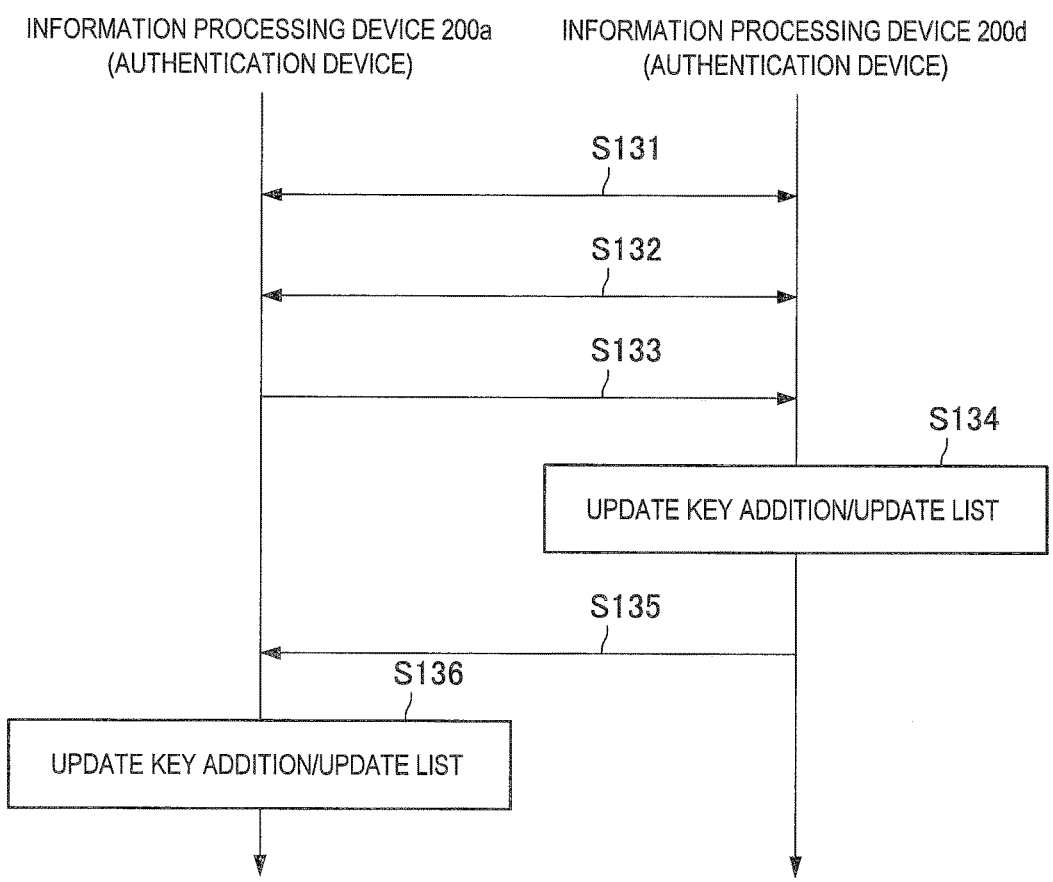
FIG. 12 is a sequence diagram for describing an example operation of an information processing system according to one embodiment of the present disclosure.

FIG. 12 is a sequence diagram for describing an example operation of the information processing system 1 according to one embodiment of the present disclosure. The example operation of FIG. 12 is performed when a key addition/update list is transmitted from the authentication device 200a to the authentication device 200d.

Initially, the authentication device 200a and the authentication device 200d are caused to be ready to communicate with each other (step S131). Next, the authentication device 200a and the authentication device 200d perform a mutual authentication process (step S132). The authentication device 200a and the authentication device 200d perform the mutual authentication process using the system key $K_S$.

After performing the mutual authentication process with the authentication device 200d in step S132, the authentication device 200a sends all key addition/update lists possessed by itself (e.g., key addition/update lists $L_{1,\ A}$=<Key 1:v2:C>, ..., and $L_{6,\ A}$=<Key 6:v1:E>) to the authentication device 200d (step S133).

When the authentication device 200d receives all the key addition/update lists from the authentication device 200a, then if there is an authentication secret key which has not been updated or added in itself, the authentication device 200d updates or adds an authentication secret key in accordance with the sequence diagram of FIG. 11. Also, when the authentication device 200d receives all the key addition/update lists from the authentication device 200a, then if there is no authentication secret key which has not been updated or added in itself, the authentication device 200d compares a device ID for which key addition or update has not been completed with the device ID of an authentication device to which the authentication device 200d can send a signal, to search for a device ID which is excluded from the devices ID for which key addition or update has not been completed. The excluded device ID is the device ID of an authentication device 200 for which addition or update is not required.

Thereafter, the authentication device 200d compares a device ID excluded from the devices ID for which addition or update has not been completed, with all its own key addition/update lists, and if there is a device ID for which addition or update is not required, deletes that device ID from the key addition/update lists, and also deletes a corresponding encrypted authentication secret key (step S134). Note that the authentication device 200d may delete the following two types of encrypted authentication secret keys: an authentication secret key encrypted using a device secret key of a device ID for which addition or update has not been completed; and an authentication secret key encrypted using the system key and the authentication secret key before update. In the latter case, such an encrypted authentication secret key is deleted only after there is no device ID for which key addition or update has not been completed.

Also, the authentication device 200d compares a device ID for which key addition or update has not been completed in all its own key addition/update lists, with the device ID of an authentication device 200 to which the authentication device 200d can send a signal, to search for a device ID which is excluded from the device IDs for which key addition or update has not been completed. The excluded device ID is compared with the key addition/update list sent by the authentication device 200a. If there is a device ID for which key addition or update is not required in the key addition/update list sent by the authentication device 200a, the authentication device 200d notifies the authentication device 200a that there is such a device ID (step S135).

The authentication device 200a, when notified by the authentication device 200d that there is a device ID for which key addition or update is not required in the key addition/update list sent by the authentication device 200a, deletes the device ID from the key addition/update list, and also deletes a corresponding encrypted authentication secret key (step S136). Note that the authentication device 200a may delete the following two types of encrypted authentication secret keys: an authentication secret key encrypted using a device secret key of a device ID for which addition or update has not been completed; and an authentication secret key encrypted using the system key and the authentication secret key before update. In the latter case, such an encrypted authentication secret key is deleted only after there is no device ID for which addition or update has not been completed.

By performing the above operation, the authentication device 200a and the authentication device 200d can transmit a key addition/update list from the authentication device 200a to the authentication device 200d.

Figure 13:
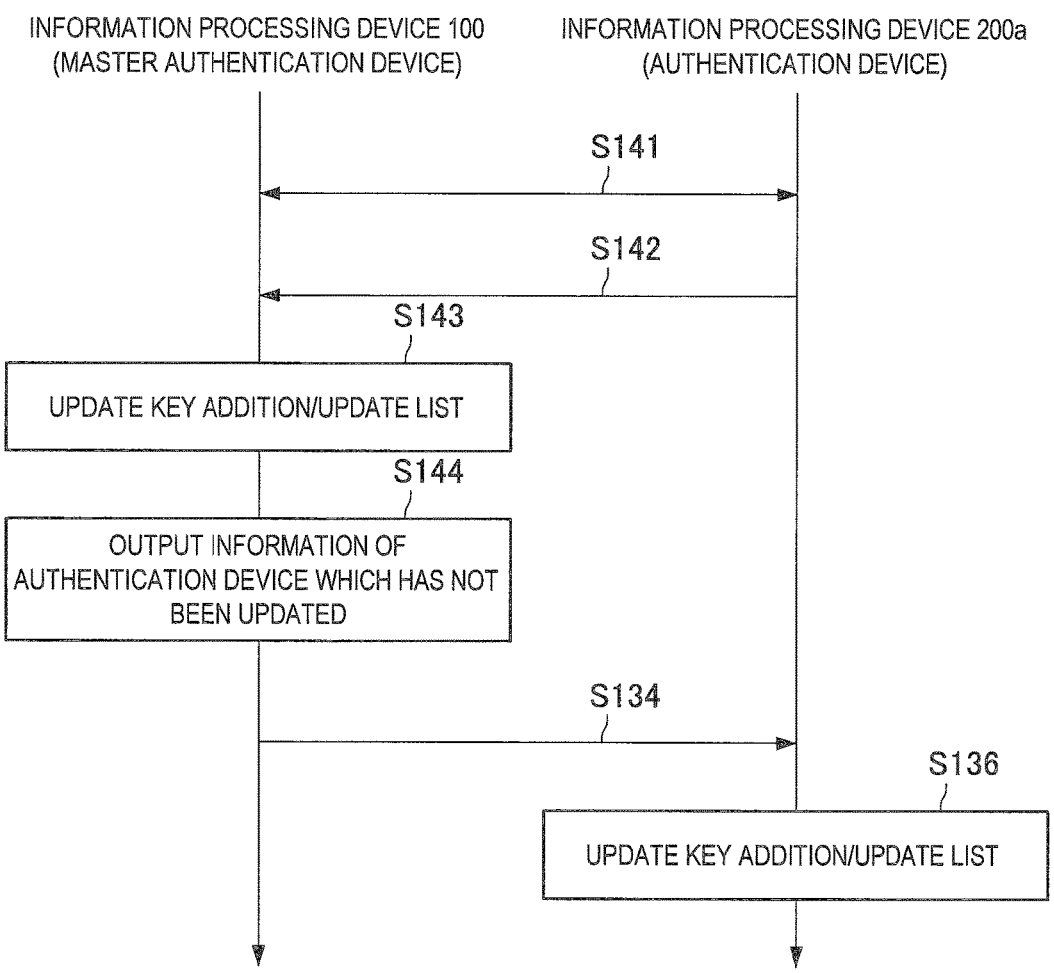
FIG. 13 is a sequence diagram for describing an example operation of an information processing system according to one embodiment of the present disclosure.

Next, a technique of transmitting a key addition/update list from an authentication device 200 to the master authentication device 100 will be described. FIG. 13 is a sequence diagram for describing an example operation of the information processing system 1 according to one embodiment of the present disclosure. The example operation of FIG. 13 is performed when a key addition/update list is transmitted from the authentication device 200a to the master authentication device 100.

Initially, the master authentication device 100 and the authentication device 200a perform a mutual authentication process (step S141). The master authentication device 100 and the authentication device 200a perform the mutual authentication process using the system key $K_S$.

After performing the mutual authentication process with the master authentication device 100 in step S141, the authentication device 200a sends all key addition/update lists possessed by itself (e.g., key addition/update lists $L_{1,A}$=<Key 1:v2:C>, ..., and $L_{6,A}$=<Key 6:v1:E>) to the master authentication device 100 (step S142).

The master authentication device 100, when receiving all the key addition/update lists from the authentication device 200a, compares a device ID for which key addition or update has not been completed, with the device ID of an authentication device to which the authentication device 200a can send a signal, to search for a device ID which is excluded from the device IDs for which addition or update has not been completed. The excluded device ID is the device ID of an authentication device 200 for which addition or update is not required.

Thereafter, the master authentication device 100 compares a device ID excluded from the devices ID for which addition or update has not been completed, with all its own key addition/update lists, and if there is a device ID for which addition or update is not required, deletes that device ID from the key addition/update lists, and also deletes a corresponding encrypted authentication secret key (step S143). Note that the master authentication device 100 may delete the following two types of encrypted authentication secret keys: an authentication secret key encrypted using a device secret key of a device ID for which addition or update has not been completed; and an authentication secret key encrypted using the system key and the authentication secret key before update. In the latter case, such an encrypted authentication secret key is deleted only after there is no device ID for which addition or update has not been completed.

The master authentication device 100, when there is an authentication device 200 for which addition or update has not been completed for all authentication secret keys, notifies of information of that authentication device 200 using the notification unit 150 (step S144). The notification of an authentication device 200 for which addition or update of an authentication secret key has not been completed may be performed by displaying a message on a display (e.g., sending of a mail, a web application, etc.), outputting audio through a loudspeaker, emitting light using an LED indicator, etc.

Thereafter, if there is a device ID for which addition or update is not required in the key addition/update list sent by the authentication device 200a, the master authentication device 100 notifies the authentication device 200a that there is such a device ID (step S145).

The authentication device 200a, when notified by the master authentication device 100 that there is a device ID for which addition or update is not required in the key addition/update list sent by the authentication device 200a, deletes the device ID from the key addition/update list, and also deletes a corresponding encrypted authentication secret key (step S146). Note that the authentication device 200a may delete the following two types of encrypted authentication secret keys: an authentication secret key encrypted using a device secret key of a device ID for which addition or update has not been completed; and an authentication secret key encrypted using the system key and the authentication secret key before update. In the latter case, such an encrypted authentication secret key is deleted only after there is no device ID for which addition or update has not been completed.

Figure 14:
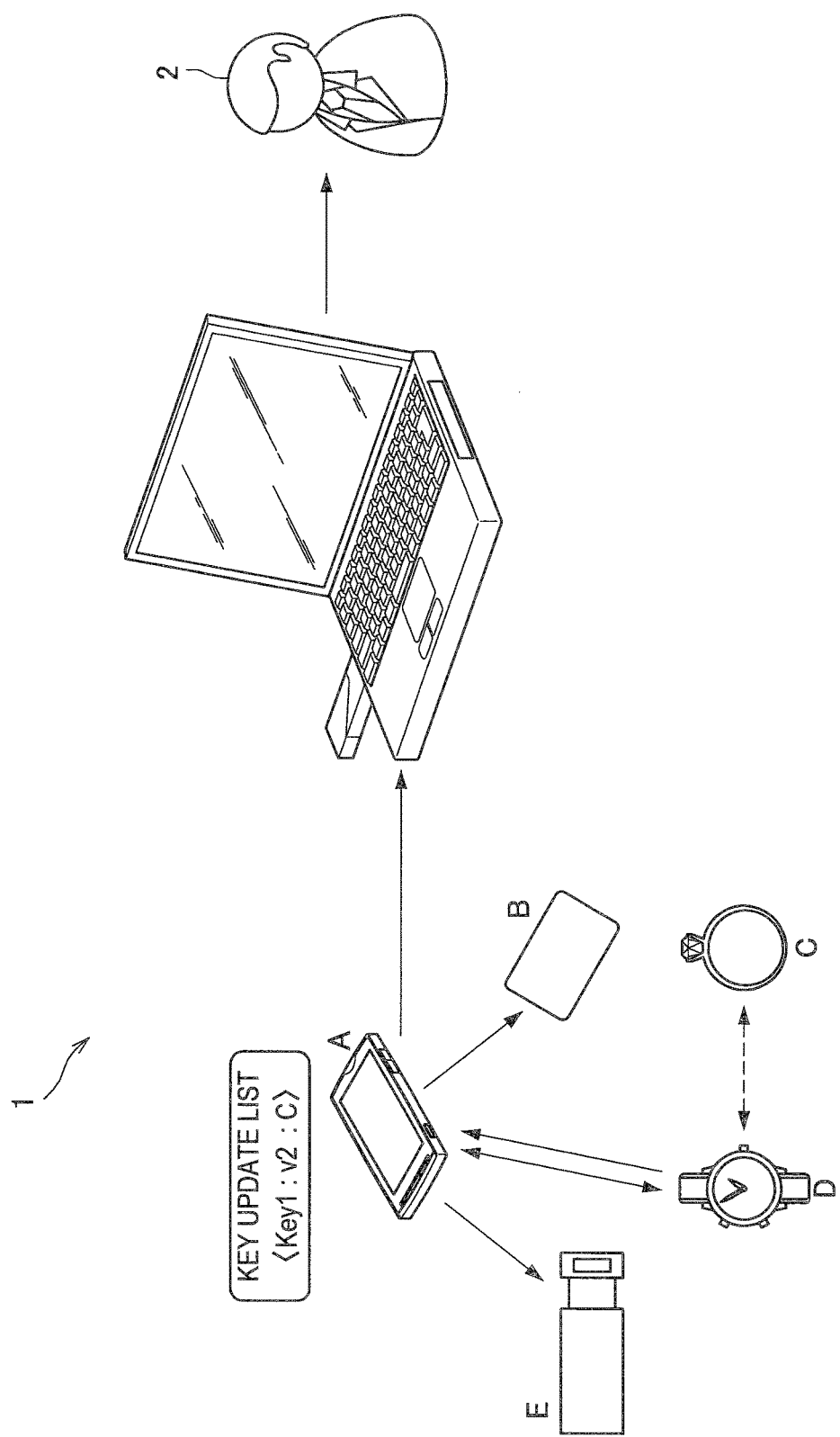
FIG. 14 is a diagram for describing how a key addition/update list is transmitted.

FIG. 14 is a diagram for describing how a key addition/update list is transmitted. FIG. 14 shows an example in which while the authentication device 200c should update an authentication secret key, the authentication device 200c has not updated the authentication secret key. In this case, the master authentication device 100 obtains a key update list <Key 1:v2:C> from the authentication device 200a. Thereafter, the master authentication device 100 can notify the manager 2 of the information processing system 1 that the authentication device 200c has not updated the authentication secret key, by referring to the key update list.

By performing the above operation, the master authentication device 100 and the authentication device 200a can transmit a key addition/update list from the authentication device 200a to the master authentication device 100. Also, by performing the above operation, the master authentication device 100 can easily detect the presence of an authentication device 200 for which addition or update of an authentication secret key has not been performed, and can also notify that there is such an authentication device 200.

When an authentication device 200 has a function of connecting to a network, it is considered that addition or update of an authentication secret key may be performed for a plurality of authentication devices 200 having such a function simultaneously. In the above example, when an authentication secret key is sent from the master authentication device 100 to the authentication device 200a, an authentication secret key which is used for the other authentication devices 200b, 200c, 200d, and 200e is sent together with that authentication secret key. In the description that follows, a technique of reducing the number of authentication secret keys transmitted to a plurality of authentication devices 200 by performing addition or update of an authentication secret key for the authentication devices 200 simultaneously, will be described.

Figure 15:
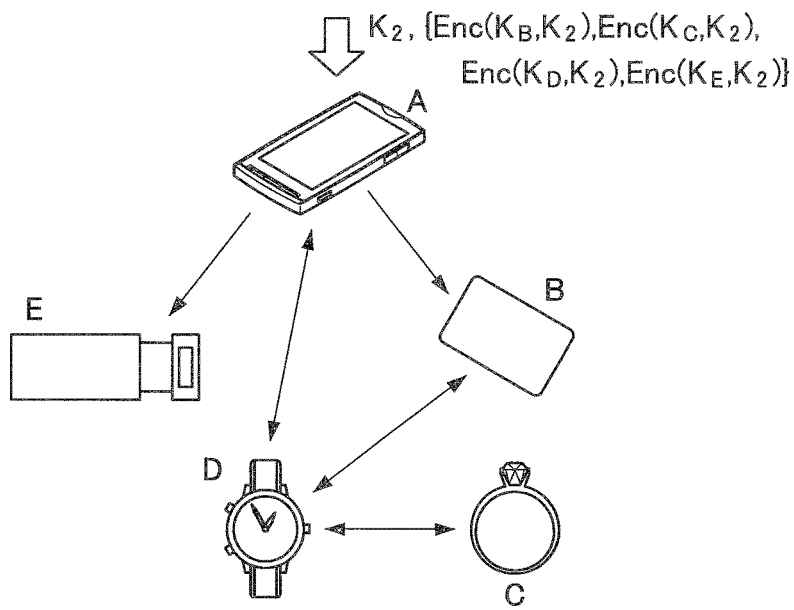
FIG. 15 is a diagram for describing how a key addition/update list is transmitted.

FIG. 15 shows a case where only the authentication device 200a first updates an authentication secret key, and thereafter, the authentication secret key is transmitted to the other authentication devices 200b, 200c, 200d, and 200e. In this case, an authentication secret key used by the other authentication devices 200b, 200c, 200d, and 200e is also transmitted from the master authentication device 100 to the authentication device 200a.

Figure 16:
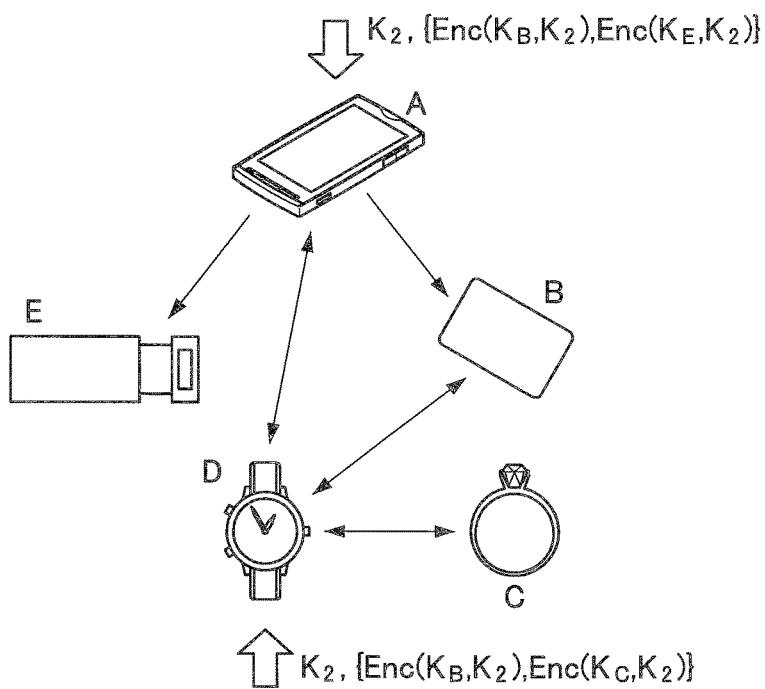
FIG. 16 is a diagram for describing how a key addition/update list is transmitted.

FIG. 16 shows a case where the authentication device 200a and the authentication device 200d first update an authentication secret key, and thereafter, the authentication secret key is transmitted to the other authentication devices 200b, 200c, and 200e. In this case, an authentication secret key used by the authentication devices 200b and 200e is transmitted from the master authentication device 100 to the authentication device 200a, and an authentication secret key used by the authentication devices 200b and 200c is transmitted from the master authentication device 100 to the authentication device 200d. Thus, by performing addition or update of an authentication secret key for a plurality of authentication devices 200 simultaneously, the number of authentication secret keys possessed by each authentication device 200 can be reduced.

An example operation will be described which is performed when addition or update of an authentication secret key from the master authentication device 100 to a plurality of authentication devices 200 is performed simultaneously. Here, it is assumed that the key $K_2$ whose authentication secret key ID is Key 2 is updated to K2'. The master authentication device 100 selects the authentication device 200a and the authentication device 200d for which an authentication secret key is to be updated simultaneously.

The master authentication device 100 generates a key update list for the authentication device 200a and the authentication device 200d. For an authentication secret key whose authentication secret key ID is Key 2, the device IDs of authentication devices for which update is to be performed are A, B, C, D, and E. The authentication device 200a and the authentication device 200d can each send a signal to all of the authentication devices 200. Therefore, the device IDs of devices to which each of the authentication device 200a and the authentication device 200d to be updated simultaneously can send a signal are A, B, C, D, and E.

Figure 17:
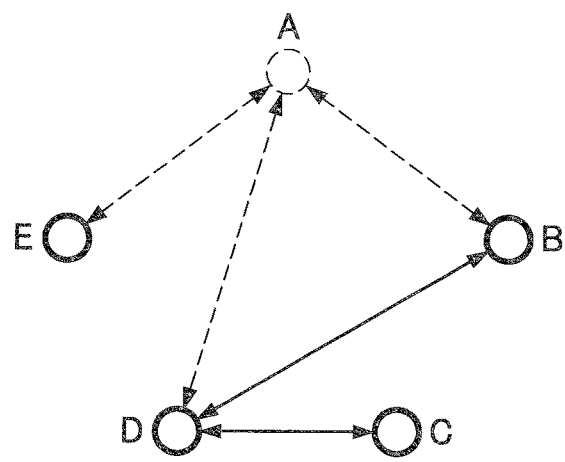
FIG. 17 is a diagram for describing a relationship between devices which can send a signal when an authentication device 200a is removed.

Next, the master authentication device 100 deletes a device ID for which key update has not been completed in the key update list. FIG. 17 is a diagram for describing a relationship between devices which can send a signal when the authentication device 200a is removed. When attention is paid to the authentication device 200a, devices which can send a signal when the authentication device 200a is removed have the relationship of FIG. 17. Because the authentication device 200d cannot send a signal to the authentication device 200a or 200e, the device IDs={A, E} are the device IDs of authentication devices 200 which cannot be reached from the authentication device 200d. When the authentication device 200a is removed, device IDs for which key update has not been completed are {D, C} after the removal.

Figure 18:
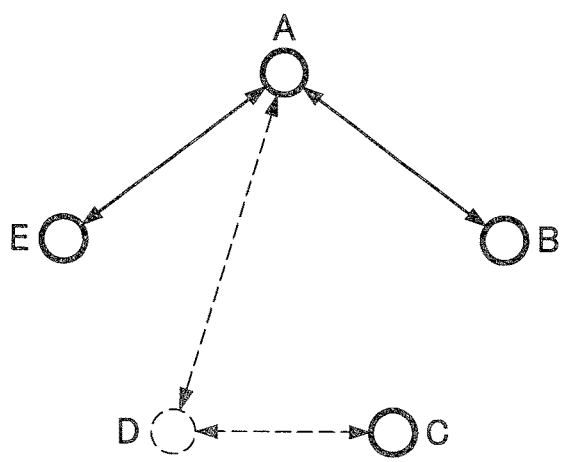
FIG. 18 is a diagram for describing a relationship between devices which can send a signal when an authentication device 200d is removed.

FIG. 18 is a diagram for describing a relationship between devices which can send a signal when the authentication device 200d is removed. When attention is paid to the authentication device 200d, devices which can send a signal when the authentication device 200d is removed have the relationship of FIG. 18. Because the authentication device 200a cannot send a signal to the authentication device 200c or 200d, the device IDs={C, D} are the device IDs of authentication devices 200 which cannot be reached from the authentication device 200a. When the authentication device 200d is removed, device IDs for which key update has not been completed are {B, E} after the removal.

Next, the master authentication device 100 generates an encrypted authentication secret key and a key update list which are to be sent to the authentication devices 200a and 200d for which update is to be performed simultaneously, based on the device ID for which key update has not been completed after the device ID removal.

In the above example, the master authentication device 100 sends a key update list $L_{2,A}$=<Key 2:v2:A, B, E> and encrypted authentication secret keys after update Enc($K_A$, $K_2'$), Enc($K_B$, $K_2'$), and Enc($K_E$, $K_2'$), or Enc($K_S+K_2$, $K_2'$), to the authentication device 200a. Thereafter, the master authentication device 100 sends a key update list $L_{2,D}$=<Key 2:v2:C, D> and encrypted authentication secret keys after update Enc($K_D$, $K_2'$), and Enc($K_C$, $K_2'$), or Enc ($K_S+K_2$, $K_2'$), to the authentication device 200d.

Thus, by sending an encrypted authentication secret key to the authentication devices 200a and 200d for which update is to be performed simultaneously from the master authentication device 100, the number of authentication secret keys which are possessed by the authentication devices 200a and 200d can be reduced. Because of the reduction in the number of authentication secret keys which should be held, the authentication devices 200a and 200d can allocate space in a storage medium, such as an internal memory, etc., for holding other information.

In the foregoing, the embodiment of the present disclosure has been described. Note that, in the above embodiment, the master authentication device 100 may not hold a device secret key or an authentication secret key. Device secret keys or authentication secret keys may be held by the PC 10 or a server on the Internet. When an authentication secret key is distributed to authentication devices 200, a device secret key or an authentication secret key may be obtained from the PC 10 or the server on the Internet when necessary.

2. Hardware Configuration

Figure 19:
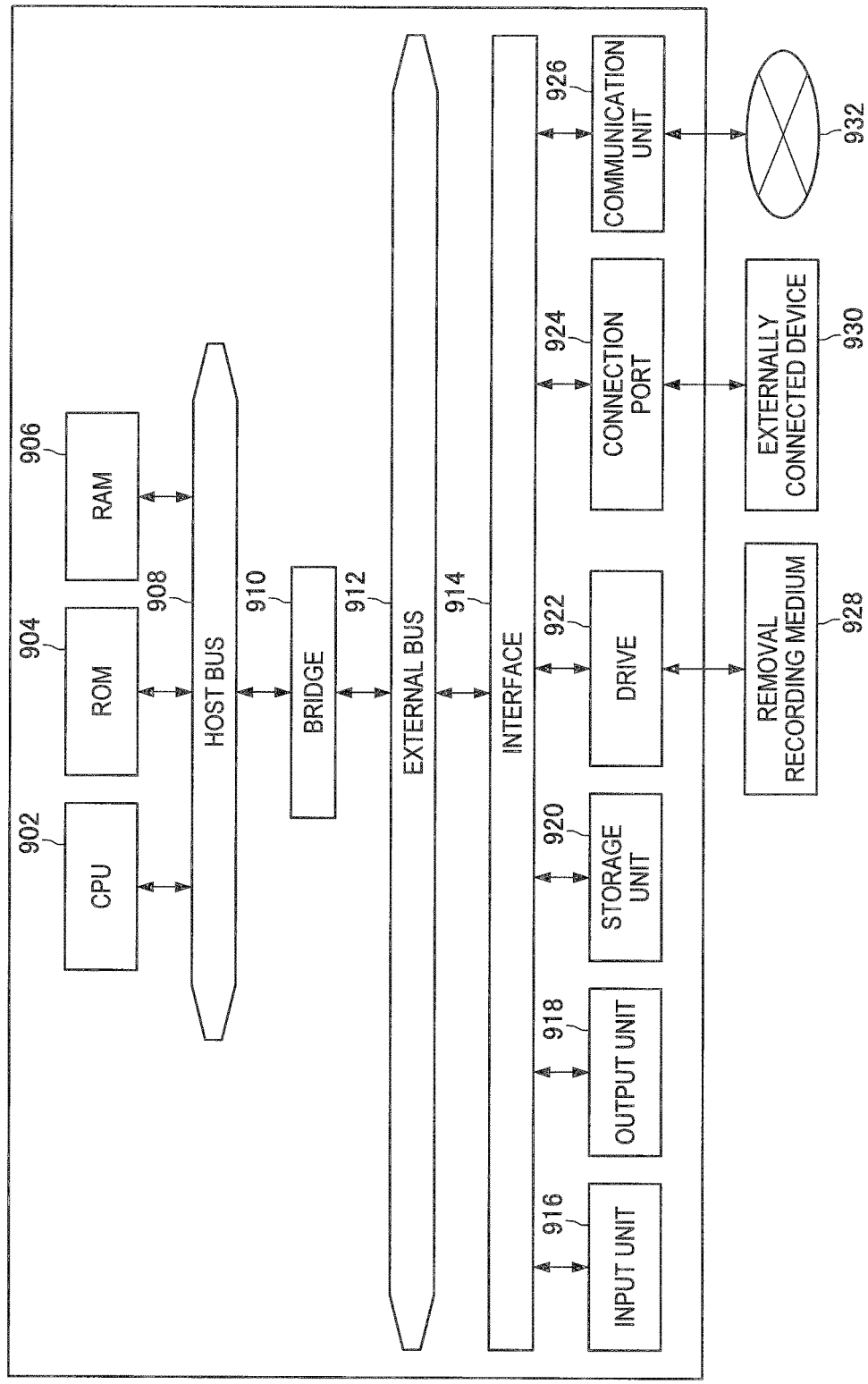
FIG. 19 is a diagram for describing an example hardware configuration.

Each of the algorithms described above can be performed by using, for example, the hardware configuration of the information processing apparatus shown in FIG. 19. That is, the processing of each of the algorithms can be realized by controlling the hardware shown in FIG. 19 using a computer program. Additionally, the mode of this hardware is arbitrary, and may be a personal computer, a mobile information terminal such as a mobile phone, a PHS or a PDA, a game machine, a contact or non-contact IC chip, a contact or non-contact IC card, or various types of information appliances. Moreover, the PHS is an abbreviation for Personal Handy-phone System. Also, the PDA is an abbreviation for Personal Digital Assistant.

As shown in FIG. 19, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removable recording medium 928. The ROM 904 is a unit for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removable recording medium 928 such as a magnetic disk, an optical disk, a magneto-optical disk, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

3. Summary

As described above, according to one embodiment of the present disclosure, the master authentication device 100 generates authentication secret keys which are to be sent to authentication devices 200 or lists for transmitting authentication secret keys between authentication devices 200, based on information about authentication secret keys used by authentication devices 200, or information about connection between authentication devices 200. Authentication devices 200 send authentication secret keys to other authentication devices 200 by referring to a list received from the master authentication device 100, and edit the list and send the edited list.

The master authentication device 100 and the authentication devices 200 according to one embodiment of the present disclosure, when an authentication secret key which is to be used in an authentication process has been updated or added, can efficiently transmit the updated or added authentication secret key from the master authentication device 100 to an authentication device 200, or between authentication devices 200.

For example, it may not be necessary to chronologically execute respective steps in the processing, which is executed by each apparatus of this specification, in the order described in the sequence diagrams or the flow charts. For example, the respective steps in the processing which is executed by each apparatus may be processed in the order different from the order described in the flow charts, and may also be processed in parallel.

Furthermore, it becomes possible to generate a computer program which makes a hardware device, such as a CPU, a ROM, and a RAM incorporated in each apparatus demonstrate the functions equivalent to the configurations of the above described apparatuses. It becomes also possible to provide a storage medium which stores the computer program. In addition, respective functional blocks shown in the functional block diagrams may be constituted from hardware devices, so that a series of processings may be implemented by the hardware devices.

While the preferred embodiments of the present disclosure have been described so far with reference to the accompanying drawings, the present disclosure is not limited to these examples. It should be understood by those skilled in the art that various modifications, combinations, sub-combinations and alterations may occur depending on design requirements and other factors insofar as they are within the scope of the appended claims or the equivalents thereof Further, the effect described in the present disclosure is not limited to only that described or illustrated. That is, the technology according to the present disclosure accomplishes other effects which are clear to a person skilled in the art from the description of the present disclosure, along with the above described effect or instead of the above described effect.

Additionally, the present technology may also be configured as below:

(1) An information processing device including:

an information storage unit configured to store information about a state in which a first secret key used during authentication is held in devices, and information about connection between the devices; and a communication unit configured to send the first secret key so that the first secret key is delivered to the devices based on the information stored in the information storage unit.

(2) The information processing device according to (1), wherein the communication unit transmits the first secret key to the devices based on the information stored in the information storage unit when the first secret key has been updated.

(3) The information processing device according to (2), wherein the communication unit transmits the first secret key encrypted using a second secret key held in a device which uses the first secret key to the device.

(4) The information processing device according to any one of (1) to (3), wherein the communication unit transmits the first secret key after update encrypted using a second secret key held in common to all the devices stored in the information storage unit and the first secret key before update, to the devices.

(5) The information processing device according to any one of (1) to (4), wherein the communication unit transmits the first secret key to a device which newly uses the first secret key based on the information stored in the information storage unit.

(6) The information processing device according to any one of (1) to (5), wherein the communication unit transmits the first secret key to a device which uses a new version of the first secret key based on the information stored in the information storage unit.

(7) The information processing device according to any one of (1) to (6), wherein the communication unit transmits the first secret key to a device which replaces the first secret key with another version of the first secret key and uses the another version of the first secret key, based on the information stored in the information storage unit.

(8) The information processing device according to any one of (1) to (7), further including:

an information updating unit configured to update information about the held state stored in the information storage unit when the communication unit has transmitted the first secret key to the devices.

(9) The information processing device according to any one of (1) to (8), wherein the communication unit transmits the information about the held state of the first secret key in response to occurrence of a predetermined trigger.

(10) The information processing device according to any one of (1) to (9), wherein the information storage unit further stores information about a device which holds the first secret key, and the communication unit selects and transmits the first secret key to be sent, based on information about the device which holds the first secret key, the information being stored in the information storage unit.

(11) The information processing device according to any one of (1) to (10), further including:

an information output unit configured to output information about a device which does not hold a latest version of the first secret key based on information about a state in which the first secret key is held.

(12) The information processing device according to any one of (1) to (11), further including:

a key holding unit configured to hold the first secret key.

(13) The information processing device according to any one of (1) to (12), wherein the communication unit selects and sends the first secret key which is to be used in a device which is reached through a destination device, based on information about connection between the devices stored in the information storage unit.

(14) The information processing device according to (13), wherein the communication unit selects and sends the first secret key other than the first secret key used in a device which is not reached if the destination device is not present, based on the information about connection between the devices stored in the information storage unit.

(15) An information processing method including:

storing information about a state in which a first secret key used during authentication is held in devices, and information about connection between the devices; and sending the first secret key so that the first secret key is delivered to the devices based on the stored information.

(16) A program for causing a computer to execute:

storing information about a state in which a first secret key used during authentication is held in devices, and information about connection between the devices; and sending the first secret key so that the first secret key is delivered to the devices based on the stored information.

What is claimed is:

1. An information processing device, comprising:
an information storage unit configured to store first information about a state of a first secret key, used in authentication, for a plurality of devices, wherein the state of the first secret key corresponds to a binary number that indicates whether the first secret key is held in each of the plurality of devices, and store second information about connection between the plurality of devices, wherein the second information about the connection between the plurality of devices comprises:
a device connection list that indicates whether the first secret key is transmitted between each of the plurality of devices, and
an adjacent device list that indicates whether the plurality of devices are connected to each other based on at least one connection scheme; and
a communication unit configured to transmit the first secret key to at least one device of the plurality of devices based on at least one of the first information or the second information stored in the information storage unit.

2. The information processing device according to claim 1, wherein
the communication unit is further configured to transmit the first secret key to the plurality of devices based on a determination that the first secret key stored in the information storage unit has been updated.

3. The information processing device according to claim 2, wherein
the communication unit is further configured to transmit the first secret key, encrypted based on a second secret key, to the at least one device of the plurality of devices configured to use the first secret key, wherein the second secret key is held in the at least one device of the plurality of devices.

4. The information processing device according to claim 1, wherein
the communication unit is further configured to transmit an updated first secret key encrypted based on a second secret key, and the first secret key before update, to the at least one device of the plurality of devices, wherein the second secret key is held in common to each of the plurality of devices.

5. The information processing device according to claim 1, wherein
the communication unit is further configured to transmit the first secret key to the at least one device of the plurality of devices based on the at least one of the first information or the second information stored in the information storage unit, wherein the at least one device is configured to use the first secret key.

6. The information processing device according to claim 1, wherein
the communication unit is further configured to transmit the first secret key to the at least one device of the plurality of devices based on the at least one of the first information or the second information stored in the information storage unit, wherein the at least one device is configured to use a new version of the first secret key.

7. The information processing device according to claim 1, wherein
the communication unit is further configured to transmit the first secret key to the at least one device of the plurality of devices based on the at least one of the first information or the second information stored in the information storage unit, wherein the at least one device is configured to replace the first secret key with a new version of the first secret key and use the new version of the first secret key.

8. The information processing device according to claim 1, further comprising:
an information updating unit configured to update the first information about the state of the first secret key stored in the information storage unit based on a determination that the communication unit has transmitted the first secret key.

9. The information processing device according to claim 1, wherein
the communication unit is further configured to transmit the first information about the state of the first secret key based on an occurrence of a trigger.

10. The information processing device according to claim 1, wherein
the information storage unit is further configured to store a third information about the at least one device of the plurality of devices configured to hold the first secret key, and
the communication unit is further configured to select and transmit the first secret key based on the third information about the at least one device of the plurality of devices, which is configured to hold the first secret key.

11. The information processing device according to claim 1, further comprising:
an information output unit configured to output a fourth information about at least one device of the plurality of devices in which a latest version of the first secret key is absent, based on the first information about the state in which the first secret key is held.

12. The information processing device according to claim 1, further comprising:
a key holding unit configured to hold the first secret key.

13. The information processing device according to claim 1, wherein
the communication unit is further configured to select and transmit the first secret key which is used in a device of the plurality of devices, which is reached through a destination device, based on the second information about connection between the plurality of devices stored in the information storage unit.

14. The information processing device according to claim 13, wherein
the communication unit is further configured to select and transmit a third secret key, other than the first secret key used in the device of the plurality of devices, which is unreachable in an absence of the destination device, based on the second information about the connection between the plurality of devices stored in the information storage unit.

15. An information processing method, comprising:
storing first information about a state of a first secret key, used in authentication, for a plurality of devices, wherein the state of the first secret key corresponds to a binary number that indicates whether the first secret key is held in each of the plurality of devices, and
storing second information about connection between the plurality of devices, wherein the second information about the connection between the plurality of devices comprises:
a device connection list that indicates whether the first secret key is transmitted between each of the plurality of devices, and
an adjacent device list that indicates whether the plurality of devices are connected to each other based on at least one connection scheme; and
transmitting the first secret key to at least one device of the plurality of devices based on at least one of the stored first information or the stored second information.

16. A non-transitory computer-readable medium having stored thereon, computer-executable instructions for causing at least one processor to execute operations, the operations comprising:
storing first information about a state of a first secret key, used in authentication, for a plurality of devices, wherein the state of the first secret key corresponds to a binary number that indicates whether the first secret key is held in each of the plurality of devices, and
storing second information about connection between the plurality of devices, wherein the second information about the connection between the plurality of devices comprises:
a device connection list that indicates whether the first secret key is transmitted between each of the plurality of devices, and
an adjacent device list that indicates whether the plurality of devices are connected to each other based on at least one connection scheme; and
transmitting the first secret key to at least one device of the plurality of devices based on at least one of the stored first information or the stored second information.

* * * * *